United States Patent
Rauhala et al.

(10) Patent No.: US 11,287,510 B2
(45) Date of Patent: Mar. 29, 2022

(54) CLIENT-BASED STORING OF TUNING PARAMETERS FOR POSITIONING SERVICES

(71) Applicant: HERE Global B.V., Eindhoven (NL)

(72) Inventors: Petri Rauhala, Tampere (FI); Lauri Aarne Johannes Wirola, Tampere (FI)

(73) Assignee: HERE GLOBAL B.V., Eindhoven (NL)

( * ) Notice: Subject to any disclaimer, the term of this patent is extended or adjusted under 35 U.S.C. 154(b) by 0 days.

(21) Appl. No.: 16/962,279

(22) PCT Filed: Jan. 16, 2018

(86) PCT No.: PCT/EP2018/050993
§ 371 (c)(1),
(2) Date: Jul. 15, 2020

(87) PCT Pub. No.: WO2019/141347
PCT Pub. Date: Jul. 25, 2019

(65) Prior Publication Data
US 2021/0063522 A1    Mar. 4, 2021

(51) Int. Cl.
*G01S 5/02* (2010.01)
*G01S 5/00* (2006.01)
*H04W 64/00* (2009.01)

(52) U.S. Cl.
CPC .......... *G01S 5/0252* (2013.01); *G01S 5/0036* (2013.01); *G01S 5/021* (2013.01); *H04W 64/003* (2013.01)

(58) Field of Classification Search
CPC ...... G01S 5/0252; G01S 5/0036; G01S 5/021; H04W 64/003
See application file for complete search history.

(56) References Cited

U.S. PATENT DOCUMENTS 9,078,231 B2   7/2015   Cho et al.
9,179,343 B2   11/2015  Yang et al.
(Continued)

FOREIGN PATENT DOCUMENTS

WO   WO 2013/034585 A1   3/2013

OTHER PUBLICATIONS

International Search Report and Written Opinion for Application No. PCT/EP2018/050993 dated Oct. 29, 2018, 14 pages.
(Continued)

*Primary Examiner* — Minjung Kim
(74) *Attorney, Agent, or Firm* — Alston & Bird LLP

(57) ABSTRACT

Inter-alia, a method is disclosed comprising: determining at least one fingerprint information indicative of at least one identifier of a cellular and/or a non-cellular radio network, wherein based on the identifier at least one cell of the cellular radio network and/or at least one node of the non-cellular radio network is identifiable; sending the at least one fingerprint information, wherein the at least one fingerprint information comprises or is accompanied by a first set of tuning parameters in case such a set of tuning parameters is stored in a memory; receiving a second set of tuning parameters in response to the sending of the at least one fingerprint information, wherein the first and/or the second set of tuning parameters respectively comprise a correction value for compensating a bias for the at least one fingerprint information; and storing the received second set of tuning parameters, wherein the first set of tuning parameters is updated with the second set of tuning parameters enabling to iteratively converge the set of tuning parameters to the actual bias. It is further disclosed an according apparatus, computer program and system.

20 Claims, 5 Drawing Sheets

(56) References Cited

U.S. PATENT DOCUMENTS

| | | | |
|---|---|---|---|
| 9,432,815 B2 | 8/2016 | Edge | |
| 9,503,216 B2 | 11/2016 | Siomina et al. | |
| 9,699,611 B1 | 7/2017 | Zhang et al. | |
| 2005/0246334 A1* | 11/2005 | Tao | G01S 5/0252 |
| 2012/0182144 A1 | 7/2012 | Richardson et al. | |
| 2015/0087239 A1* | 3/2015 | Yang | H04W 64/00 |
| | | | 455/67.11 |
| 2015/0350850 A1* | 12/2015 | Edge | G01S 5/0018 |
| | | | 455/456.1 |
| 2017/0223659 A1* | 8/2017 | Zhang | G01S 5/021 |
| 2017/0343638 A1* | 11/2017 | Jampani | G01S 5/0252 |

OTHER PUBLICATIONS

Kjærgaard, M. B., "Indoor Location Fingerprinting with Heterogeneous Clients", Pervasive and Mobile Computing, vol. 7, No. 1, (Feb. 2011), pp. 31-43.

* cited by examiner

CLIENT-BASED STORING OF TUNING PARAMETERS FOR POSITIONING SERVICES

CROSS-REFERENCE TO RELATED APPLICATIONS

This application is a national phase entry of International Application No. PCT/EP2018/050993, filed Jan. 16, 2018, the entire contents of which are incorporated herein by reference.

FIELD

The following disclosure relates to the field of positioning, or more particularly relates to systems, apparatuses, and methods for compensating variations of senor readings across clients, wherein those sensor readings are used for providing positioning services to the clients.

BACKGROUND

Modern global cellular and non-cellular positioning technologies are based on collecting large global databases containing information on the cellular and non-cellular signals as data. This data originates from the users of these positioning technologies.

The data from the users is typically in the form of fingerprints, which may contain GNSS—(Global Navigation Satellite System) based location estimate and/or measurements taken from radio interfaces (cellular and/or non-cellular).

This data gets uploaded to a server or a cloud, where algorithms are run to generate models of wireless communication nodes for positioning purposes. Such models may be coverage areas, (radio) node positions, radio propagation models, or the like, for instance in the form of so called radio maps. In the end, these models are transferred to the positioning servers or back to the user terminals for use in position determination.

Mobile terminals of end user having GNSS-capability can benefit from using cellular and/or non-cellular positioning technologies in terms of time-to-first-fix and a reduction of power-consumption of the mobile terminal. Also, not all applications require GNSS-based position. Cellular respectively non-cellular positioning technologies work indoors, which is generally a challenging environment for GNSS-based technologies.

In a terminal-assisted mode, a mobile terminal of an end user performs measurements of cellular and/or non-cellular air interface. Those measurements in general stem from radio sensor readings of the mobile terminal (e.g. BLE (Bluetooth Low Energy), Wi-Fi, and/or cellular measurements). Then, those measurements are provided to a (remote) server or server cloud providing radio maps and/or positioning services. The server or the server cloud determines a location estimate of the position of the mobile terminals based at least partially on the radio sensor readings. In return, the server provides the location estimate back to the mobile terminal.

SUMMARY OF SOME EXEMPLARY EMBODIMENTS

However, due to the multitude of devices in particular mobile terminals participating in the data collection and in the location discovery based on the collected data, there exist differences in the measurements although those measurements are gathered at the same location. For instance, the different size and position of the antenna(s), possible interference of other radios on-board, different firmware, different hardware, and/or cover material covering in particular the antenna(s) influence the radio sensor readings. In other words, different devices report different radio sensor readings in the same circumstance. Further, there may be differences even between units of the same device model.

It is thus, inter alia, an object of the invention to compensate the device specific bias of radio sensor readings of such devices to enhance the determining of accurate location estimate.

According to a first exemplary aspect of the present invention, a method is disclosed, the method comprising:
  determining at least one fingerprint information indicative of at least one identifier of a cellular and/or a non-cellular radio network, wherein based on the identifier at least one cell of the cellular radio network and/or at least one node of the non-cellular radio network is identifiable;
  sending the at least one fingerprint information, wherein the at least one fingerprint information comprises or is accompanied by a first set of tuning parameters in case such a set of tuning parameters is stored in a memory;
  receiving a second set of tuning parameters in response to the sending of the at least one fingerprint information wherein the first and/or the second set of tuning parameters respectively comprise a correction value for compensating a bias for the at least one fingerprint information; and
  storing the received second set of tuning parameters, wherein the first set of tuning parameters is updated with the second set of tuning parameters enabling to iteratively converge the set of tuning parameters to the actual bias.

This method may for instance be performed and/or controlled by an apparatus, for instance an electronic device, e.g. a mobile terminal. For instance, the method may be performed and/or controlled by using at least one processor of the electronic device.

According to a further exemplary aspect of the invention, a computer program is disclosed, the computer program when executed by a processor causing an apparatus, for instance a server, to perform and/or control the actions of the method according to the first exemplary aspect.

The computer program may be stored on computer-readable storage medium, in particular a tangible and/or non-transitory medium. The computer readable storage medium could for example be a disk or a memory or the like. The computer program could be stored in the computer readable storage medium in the form of instructions encoding the computer-readable storage medium. The computer readable storage medium may be intended for taking part in the operation of a device, like an internal or external memory, for instance a Read-Only Memory (ROM) or hard disk of a computer, or be intended for distribution of the program, like an optical disc.

According to a further exemplary aspect of the invention, an apparatus is disclosed, configured to perform and/or control or comprising respective means for performing and/or controlling the method according to the first exemplary aspect.

The means of the apparatus can be implemented in hardware and/or software. They may comprise for instance at least one processor for executing computer program code for performing the required functions, at least one memory storing the program code, or both. Alternatively, they could comprise for instance circuitry that is designed to implement the required functions, for instance implemented in a chipset or a chip, like an integrated circuit. In general, the means may comprise for instance one or more processing means or processors.

According to a further exemplary aspect of the invention, an apparatus is disclosed, comprising at least one processor and at least one memory including computer program code, the at least one memory and the computer program code configured to, with the at least one processor, cause an apparatus, for instance the apparatus, at least to perform and/or to control the method according to the first exemplary aspect.

The above-disclosed apparatus according to any aspect of the invention may be a module or a component for a device, for example a chip. Alternatively, the disclosed apparatus according to any aspect of the invention may be a device, for instance a server or server cloud. The disclosed apparatus according to any aspect of the invention may comprise only the disclosed components, for instance means, processor, memory, or may further comprise one or more additional components.

According to a second exemplary aspect of the present invention, a method is disclosed, the method comprising:
  receiving at least one fingerprint information indicative of at least one identifier of a cellular and/or a non-cellular radio network, wherein based on the identifier at least one cell of the cellular radio network and/or at least one node of the non-cellular radio network is identifiable, wherein the at least one fingerprint information optionally comprises or is accompanied by a first set of tuning parameters;
  determining a second set of tuning parameters, wherein the first and/or the second set of tuning parameters respectively comprise a correction value for compensating a bias for the at least one fingerprint information, wherein based at least partially on the correction value device specific parameters influencing the at least one fingerprint information can be compensated; and
  outputting the determined second set of tuning parameters.

This method may for instance be performed and/or controlled by an apparatus, for instance a server. Alternatively, this method may be performed and/or controlled by more than one apparatus, for instance a server cloud comprising at least two servers. The server may for instance be a positioning server providing positioning services, e.g. determining location estimate(s), or providing radio maps. In the latter case, such a server may also be referred to as a radio map and positioning server. Alternatively, this method may for instance be performed and/or controlled by at least two apparatuses, for instance two servers, e.g. a positioning server and an auxiliary server. This auxiliary server may for instance be a tracking server that may for instance keep record of a time history of one or more locations of electronic devices (e.g. the first apparatus).

According to a further exemplary aspect of the invention, a computer program is disclosed, the computer program when executed by a processor causing an apparatus, for instance a server, to perform and/or control the actions of the method according to the second exemplary aspect.

The computer program may be stored on computer-readable storage medium, in particular a tangible and/or non-transitory medium. The computer readable storage medium could for example be a disk or a memory or the like. The computer program could be stored in the computer readable storage medium in the form of instructions encoding the computer-readable storage medium. The computer readable storage medium may be intended for taking part in the operation of a device, like an internal or external memory, for instance a Read-Only Memory (ROM) or hard disk of a computer, or be intended for distribution of the program, like an optical disc.

According to a further exemplary aspect of the invention, an apparatus is disclosed, configured to perform and/or control or comprising respective means for performing and/or controlling the method according to the second exemplary aspect.

The means of the apparatus can be implemented in hardware and/or software. They may comprise for instance at least one processor for executing computer program code for performing the required functions, at least one memory storing the program code, or both. Alternatively, they could comprise for instance circuitry that is designed to implement the required functions, for instance implemented in a chipset or a chip, like an integrated circuit. In general, the means may comprise for instance one or more processing means or processors.

According to a further exemplary aspect of the invention, an apparatus is disclosed, comprising at least one processor and at least one memory including computer program code, the at least one memory and the computer program code configured to, with the at least one processor, cause an apparatus, for instance the apparatus, at least to perform and/or to control the method according to the second exemplary aspect.

The above-disclosed apparatus according to any aspect of the invention may be a module or a component for a device, for example a chip. Alternatively, the disclosed apparatus according to any aspect of the invention may be a device, for instance a server or server cloud. The disclosed apparatus according to any aspect of the invention may comprise only the disclosed components, for instance means, processor, memory, or may further comprise one or more additional components.

According to a third exemplary aspect of the invention, a system is disclosed, comprising:
  a first apparatus (e.g. a mobile terminal) according to the first exemplary aspect of the invention as disclosed above, and a second apparatus (e.g. a server or a server cloud) according to the second exemplary aspect of the invention as disclosed above, which together are adapted to perform and/or control the methods according to the first and the second exemplary aspects of the present invention.

Additionally, the system according to the third exemplary aspect of the present invention may further comprise a third apparatus (e.g. an auxiliary server) that receives the at least one fingerprint information or the positioning request from the first apparatus, and transmits (e.g. relays) at least the at least one fingerprint information (e.g. comprised by the positioning request) to the second apparatus, wherein optionally the third apparatus may transmit (e.g. relay) a set of tuning parameters to the second apparatus together with the at least one fingerprint information.

Further, in case the at least one fingerprint information is received by the second apparatus from the third apparatus, the (second) set of tuning parameters that is determined by the second apparatus is outputted to the third apparatus, wherein the third apparatus transmits (e.g. relays) this set of tuning parameters to the first apparatus. Alternatively or additionally to the transmitting (e.g. relaying) of the set of tuning parameters from the third apparatus to the first apparatus, the third apparatus may for instance store the set of tuning parameters, e.g. in a database comprised by or connectable to the third apparatus.

In the following, exemplary features and exemplary embodiments of all aspects of the present invention will be described in further detail.

The at least one fingerprint information may for instance comprise or represent a GNSS—(Global Navigation Satellite System) based location estimate. Alternatively or additionally, such a piece of fingerprint information may for instance comprise one or more measurements of one or more signals that are observable at a certain location.

The one or more measurement may for instance be gathered, e.g. by at least one sensor (e.g. also referred to as sensor readings). The at least one sensor may for instance be a radio interface (e.g. a cellular and/or a non-cellular radio interface like a transceiver)). Such a sensor may for instance be comprised by or being connectable to the first apparatus.

The at least one fingerprint information may for instance be determined based at least partially on one or more measurements, e.g. gathered (e.g. measured) by the at least one sensor. The at least one sensor may for instance be comprised by the first apparatus. The at least one sensor may for instance be or be part of a radio sensor enabling one or more signals to be received, wherein those one or more signals are sent (e.g. transmitted) by entities of the cellular and/or the non-cellular network. Such a radio sensor may for instance be a receiver or a transceiver comprising a sender and a receiver.

One or more measurements may for instance be or represent one or more global and/or local identifiers of cellular network cells observable at the location, where the one or more measurements are gathered.

Further, the one or more measurements may for instance be or represent one or more identifiers of one or more WLAN (Wireless Local Area Network) access points, e.g. in the form of a BSSID (Basic Service Set Identifier) or a MAC (Media-Access-Control) address. Further, the measurements may for instance be or represent a SSID (Service Set Identifier).

Further, the one or more measurements may for instance be or represent one or more identifiers of one or more beacons (e.g. BT—(Bluetooth) and/or BLE—(Bluetooth Low Energy) beacons), e.g. in the form of a MAC address of the beacon.

The non-cellular network may for instance be configured according to WLAN-, BT- and/or BLE-, and/or Zigbee specification, to name but a few non-limiting examples.

Such a non-cellular network may for instance comprise one or more (radio) nodes, e.g. as an infrastructure. Such one or more radio nodes may for instance be installed in a specific, thus fixed location.

The one or more radio nodes may for instance be comprised by a venue, e.g. by an infrastructure of the venue. The venue may for instance be a building, shopping mall, office complex, public accessible location (e.g. station, airport, university, or the like), to name but a few non-limiting examples.

A respective radio node of the one or more radio nodes may for instance be a beacon used for indoor positioning and/or floor detection. The radio nodes may for instance be configured according to BT- and/or BLE-specification, or may for instance be Wi-Fi Access Points for indoor positioning and/or floor detection, e.g. according to WLAN-specification. Indoor positioning and/or floor detection may for instance be performed based on a radio map (more details of such a radio map are described below). A respective radio node of the one or more radio nodes may for instance comprise or be connectable to a transceiver, e.g. according to BT-, BLE-, and/or WLAN-specification to provide wireless-based communication.

A respective radio node of the one or more radio nodes of a non-cellular network may for instance transmit one or more signals, wherein the one or more signals may for instance comprise an identifier of the respective radio node. In case one or more transmitted signals of the respective radio node are received, e.g. by the at least one sensor, the respective radio node may for instance be identifiable based at least partially on such an identifier.

The cellular network may for instance be configured according to GSM (Global System for Mobile Communications), CDMA (Code Division Multiple Access), WCDMA (Wideband CDMA), TD-SCDMA (Time Division Synchronous Code Division Multiple Access), LTE (Long Term Evolution), LTE-A (LTE-Advanced) specification.

According to an exemplary embodiment of the first exemplary aspect of the present invention, the at least one fingerprint information is comprised by a positioning request that is sent.

The positioning request may for instance be indicative of requesting a location respectively position, e.g. of the first apparatus that determined the at least one fingerprint information to be determined (e.g. calculated; estimated). Such a positioning request may for instance be received, e.g. by the second apparatus (e.g. a server or a server cloud providing positioning services). Such a server or server cloud may also be referred to as "radio map and positioning server". Further, such a server or server cloud may for instance provide a service for a floor detection, e.g. for determining a floor on which the first apparatus is located inside of a venue. For instance, a mobile terminal located in a scenario may require such indoor positioning and/or floor detection to be performed.

The positioning request may for instance comprise the at least one fingerprint information. Alternatively, the positioning request may for instance be accompanied by the at least one fingerprint information. Thus, the positioning request may for instance be accompanied by the at least one fingerprint information e.g. by transmitting the positioning request and the at least one fingerprint information in separate data packets, to name but one non-limiting example.

Further, the at least one fingerprint information, or the positioning request may for instance comprise or be accompanied by a first set of tuning parameters. Such a set of tuning parameters may for instance be indicative of or represent or comprise a correction value for compensating a bias for the at least one fingerprint information, wherein based at least partially on the correction value in particular device specific parameters (e.g. of the first apparatus) influencing the at least one fingerprint information, or more specifically the one or more measurements gathered by the at least one sensor that are used, at least partially, for determining the at least one fingerprint information, can be compensated. By such a compensation, accurate or more accurate location estimates indicative of a location respectively position (e.g. of the first apparatus requesting its position respectively location to be determined by sending a positioning request) can be determined and subsequently provided. Such a set of tuning parameters may for instance enable a service, e.g. provided by a server (e.g. a positioning service) to be tuned according to the set of tuning parameters.

The first set of tuning parameters—in case it was received prior to performing and/or controlling the method according to the first exemplary aspect of the present invention—is stored in the memory, wherein the memory may for instance be comprised by or be connectable to the first apparatus.

After the at least one fingerprint information, or the positioning request is sent, e.g. to the second apparatus (e.g. a radio map and positioning server), a second set of tuning parameters is received.

According to an exemplary embodiment of the first exemplary aspect of the present invention, the second set of tuning parameters is stored only in case the first set of tuning parameters is outdated.

According to an exemplary embodiment of the first exemplary aspect of the present invention, the second set of tuning parameters is received only in case the first set of tuning parameters is outdated.

The first set of tuning parameters may for instance be outdated in case device specific parameters (e.g. of the first apparatus) influencing the at least one fingerprint information, or more specifically the one or more measurements gathered by the at least one sensor, and wherein one or more measurements are used, at least partially, for determining the at least one fingerprint information, may have changed with respect to the first set of tuning parameters. Those device specific parameters may for instance have changed e.g. in case a firmware was updated by the device (e.g. the first apparatus), and/or at least a part of the hardware (e.g. cover of the first apparatus, display of the first apparatus, to name but a few non-limiting examples) have changed. Further, the second set of tuning parameters may for instance be received by the first apparatus, in case the sent positioning request does not comprise or is not accompanied by such a first set of tuning parameters. In this last mentioned case, the first apparatus always receives a set of tuning parameters upon the sending of the at least one fingerprint information, or the positioning request.

When the first apparatus sends the at least one fingerprint information, or the positioning request for the first time, e.g. to a second apparatus performing and/or controlling the second exemplary aspect of the present invention, the at least one fingerprint information, or positioning request does not comprise or is not accompanied by a (first) set of tuning parameters since such a set of tuning parameters is not available on side of the first apparatus (e.g. none of such a set of tuning parameters is stored in a memory of the first apparatus). In case such a set of tuning parameters is available on side of the first apparatus, this set of tuning parameters is sent (e.g. provided) together with the at least one fingerprint information, or the positioning request. This set of tuning parameters may for instance be used by the recipient (e.g. the second apparatus) to determine another set of tuning parameters considering the provided set of tuning parameters. Then, the first apparatus may for instance receive the "new" set of tuning parameters as a second set of tuning parameters, wherein this second set of tuning parameters may for instance be sent together with the at least one fingerprint information, or the positioning request the next time. In this way, it is enabled to iteratively converge the set of tuning parameters to the actual bias.

When the first apparatus sends the at least one fingerprint information, or the positioning request, wherein the at least one fingerprint information, or the positioning request respectively comprise or is accompanied by the first set of tuning parameters, the recipient (e.g. the second apparatus) of the first set of tuning parameters may for instance not determine a second set of tuning parameters in case it is determined that this first set of tuning parameters that is received by the second apparatus is not outdated, since, for instance this first set of tuning parameters has already converged to the actual bias. Then, there is no need to determine the second set of tuning parameters. Further, there may for instance be no need for the second apparatus to output the second set of tuning parameters to the first apparatus. Thus, the second set of tuning parameters may for instance only be received (by the first apparatus) in case the (sent; e.g. provided) first set of tuning parameter is outdated, since in this case, the second apparatus determines such a second set of tuning parameters.

According to an exemplary embodiment of all aspects of the present invention, at least one fingerprint information does not comprise or is not accompanied by the first set of tuning parameters in case the first set of tuning parameters has changed.

The first set of tuning parameters may for instance have changed due to a reset (e.g. of the first apparatus). Such a reset may for instance be a device reset of the first apparatus.

For instance, the first apparatus may have stored the first set of tuning parameters, wherein the first set of tuning parameters may have been received as a response of another at least one fingerprint information, or another positioning request sent prior to the sending of the at least one fingerprint information, or the positioning request of the method according to the first exemplary aspect of the present invention. Since the first apparatus that has stored the first set of parameter values does not know which parameters respectively which set of tuning parameters it stores, or which values the set of tuning parameter has or represents, in case of such a (device) reset, a stored first set of tuning parameters is omitted. Thus, the at least one fingerprint information, or the positioning request does not comprise or is not accompanied by the first set of tuning parameters in case the first set of tuning parameters has changed.

According to an exemplary embodiment of all aspects of the present invention, the at least one fingerprint information further comprises or represents one or more signal strength values, wherein each of the one or more signal strength values is indicative of a signal strength of one or more signals observable at the location at which one or more measurements used for determining the at least one fingerprint information are gathered, and wherein the one or more signals are sent by at least one cell of the cellular radio network and/or by at least one radio node of the non-cellular radio network.

Further, the one or more measurements may for instance be or represent signal strength and/or pathloss estimates. Further, the one or more measurements may for instance be or represent timing measurements (timing advance and/or round-trip time). At least one sensor (e.g. a transceiver), e.g. comprised by the first apparatus, may for instance be used for determining (e.g. measuring) the one or more measurements. Further, such a transceiver may for instance be used to transmit (e.g. broadcast) the determined one or more measurements.

Additionally or alternatively, the one or more measurements may for instance be or represent signal strengths information (e.g. received signal strength index, physical Rx level) of one or more signals transmitted, e.g. by one or more WLAN access points.

One or more signal strength values may for instance be determined by measuring the one or more signal strength values based on sent beacon signals of the one or more beacons. One of the one or more signal strength values may for instance be represented by a received signal strength value (RSS). Such a received signal strength value may for instance represent the power of a received radio positioning support signal (e.g. at the at least one first apparatus), wherein such a radio positioning support signal may for instance be sent (e.g. periodically) from each of the one or more beacons. An example of a received signal strength parameter is a received signal strength indicator (RSSI) or a representation of a physical receiving power level value (e.g. a Rx power level value) in dBm. A signal strength value may for instance represent a signal strength measurement of the observable signal strength at the location of the measurement.

After determining the one or more signal strength values, the positioning request may for instance comprise or be accompanied by the one or more measurements, e.g. representing one or more signal strength values.

According to an exemplary embodiment of all aspects of the present invention, the at least one fingerprint information is determined based at least partially on one or more measurements gathered by at least one sensor (e.g. of the first apparatus).

Additionally, the at least one fingerprint information is determined based at least partially on one or more identifiers of entities of the cellular and/or non-cellular radio network. Such an entity of the cellular radio network may for instance be a base station of a cell of the cellular radio network. Further, such an entity of the non-cellular radio network may for instance be a radio node (e.g. WLAN access point, or a (BT- and/or BLE) beacon).

The at least one fingerprint information may for instance be determined (e.g. calculated) based at least partially on a GNSS-based location and the one or more measurements, e.g. gathered by the at least one sensor (e.g. comprised by or connectable to the first apparatus). The determined at least one fingerprint information may thus contain at least one GNSS-based location estimate and the one or more measurements taken from the cellular and/or non-cellular radio networks.

According to an exemplary embodiment of all aspects of the present invention, the first apparatus is or is part of mobile terminal.

The first apparatus may for instance be a terminal (e.g. a smartphone, tablet, navigation device, to name but a few non-limiting examples). The electronic device may for instance be portable (e.g. weigh less than 5, 4, 3, 2, or 1 kg). The electronic device may for instance comprise or be connectable to a display for displaying a radio map, e.g. the generated radio map. The electronic device may for instance be configured to perform indoor navigation and/or positioning and/or floor detection based on a provided radio map. The electronic device may for instance comprise or be connectable to means for outputting sound, e.g. in the form of spoken commands or information. The electronic device and/or the terminal may for instance comprise or be connectable to one or more sensors for determining the electronic devices position, such as radio-based indoor positioning from e.g. observed RSS—(received signal strength) measurements as e.g. a horizontal position and/or floor level (e.g. as vertical position), e.g. in a venue.

According to an exemplary embodiment of all aspects of the present invention, the memory is comprised by the first apparatus.

The second set of tuning parameters—in case it is received—is stored in the memory comprised by or being connectable to the first apparatus. When the second set of tuning parameters is stored in such a memory, a first set of tuning parameter that may for instance be already stored in the memory, may for instance be updated with the second set of tuning parameters, or alternatively may be replaced (e.g. overwritten) by the second set of tuning parameters. The second set of tuning parameters e.g. stored in the aforementioned way, may for instance be used as another first set of tuning parameters for sending a further positioning request, e.g. when the method according to the first exemplary aspect of the present invention is performed and/or controlled again.

According to an exemplary embodiment of all aspects of the present invention, the method further comprises:
 determining a status information indicative of whether or not the first set of tuning parameters is outdated in case such a first set of tuning parameters is stored, wherein the status information is determined based at least partially on one or more reset parameters indicative of a change of a device specific parameter, wherein the status information is determined prior to the sending of the positioning request, and wherein dependent upon the status information the first set of tuning parameters is comprised by or accompanying the positioning request.

Such a change may for instance be an upgrade of an operating system of the first apparatus, and/or a physical change of the first apparatus, to name but a few non-limiting examples. Such a change may for instance be represented by one or more reset parameters.

According to an exemplary embodiment of all aspects of the present invention, the one or more reset parameters are represented by one or more of the following device specific changes:
 i) one or more firmware changes;
 ii) one or more physical changes;
 iii) one or more further changes influencing the one or more measurements gathered by the at least one sensor.

The one or more reset parameters i) to iii) may for instance have occurred to the first apparatus.

A firmware change may for instance be a change of an operating system of the first apparatus.

A physical change may for instance be a cover change of the first apparatus, and/or a display change, e.g. of a broken display of the first apparatus, and/or a similar event with respect to the first apparatus, to name but a few non-limiting examples. Such a physical change and/or similar event with respect to the first apparatus may for instance change the one or more measurements gathered by the at least one sensor. In case of such a physical change and/or similar event with respect to the first apparatus, the determined status information may for instance represent that such a physical change and/or similar event with respect to the first apparatus has taken place.

In case that such a physical change and/or similar event with respect to the first apparatus has taken place, a stored (first) set of tuning parameters may for instance be erased. Further, the next time a positioning request is sent by the first apparatus, this positioning request may not comprise or may not be accompanied by the first set of tuning parameters. Additionally, this positioning request may for instance explicitly comprise a request for a new set of tuning parameters. It will be understood that even without such an explicit request for a new set of tuning parameters, the second apparatus will automatically, at least partially, determine the (second) set of tuning parameters and sent this determined (second) set of tuning parameters to the originator—the first apparatus—of the previously received positioning request.

Such a positioning request may for instance be provided (e.g. sent) from the first apparatus to the second apparatus.

It will be understood that the first set of tuning parameters and the second set of tuning parameters may for instance be indicative of equal correction values for compensating a bias for the same device, e.g. a mobile terminal. The difference between the first set of tuning parameters and the second set of tuning parameters may for instance be that one or more physical parameters influencing e.g. the measurements (e.g. gathered by at least one sensor, in particular a radio interface) that are considered when determining the at least one fingerprint information by the first apparatus (e.g. mobile terminal) may have changed (e.g. due to a different or new firmware, different or new cover of the electronic device, to name but a few non-limiting examples). The difference of the first set of tuning parameters and the second set of tuning parameters as referred to herewith, is related to the sending of the positioning request from the first apparatus to the second apparatus, in which case it is referred to the set of tuning parameters as the first set of tuning parameters. In case upon the reception of the positioning request by the second apparatus, and the second apparatus has determined a new set of tuning parameters, it is referred to this new set of tuning parameters as the second set of tuning parameters.

The determined second set of tuning parameters may for instance be outputted. The second set of tuning parameters may for instance be outputted by being provided or caused providing (e.g. to the first apparatus (e.g. the electronic device), or to another entity that transmits the second set of tuning parameters e.g. to the first apparatus).

The method according to the first exemplary aspect of the present invention and the method according to the second exemplary aspect of the present invention may for instance be performed and/or controlled together. In this way, the first apparatus may receive a set of tuning parameters so that those set of tuning parameters do not need to be stored on the part of the second apparatus, e.g. a server or a database comprised by or being connectable to the second apparatus. The first apparatus does not need to know which set of tuning parameters, or which information are comprised by the set of tuning parameters. Simply, the first apparatus can store the set of tuning parameters without such knowledge. Thus, the second apparatus does not need to store the set of tuning parameters. In this way, the first apparatus may for instance handle such a set of tuning parameters like a so-called black box. A new set of tuning parameters can be determined by the second apparatus freely, and then be transmitted to the first apparatus. Upon reception of such a set of tuning parameters, the first apparatus may for instance upgrade an existing set of tuning parameters, without any further implementation requirements needed on the side of the first apparatus, and additionally on the side of the second apparatus.

In this way, the bias is estimated in an iterative manner on side of the second apparatus, wherein the bias may be estimated based at least partially on the positioning request and the at least one fingerprint information comprised by or accompanying the positioning request. Further, it can be kept track of unique and maybe changing tuning parameters comprised by a set of tuning parameters for the device(s) (e.g. mobile terminal(s)).

According to an exemplary embodiment of the second exemplary aspect of the present invention, the second set of tuning parameters is determined based at least partially on the at least one fingerprint information and optionally on the first set of tuning parameters, wherein the second set of tuning parameters converges to the actual bias in case the second set of tuning parameters is determined based at least partially on the at least one fingerprint information and the first set of tuning parameters.

Thus, in case the determining of the second set of tuning parameters is based at least partially on the at least one fingerprint information and the first set of tuning parameters, the second set of tuning parameters is iteratively determined. For instance, after an initial determining of the second set of tuning parameters, this second set of tuning parameters is output, e.g. to the device from that the received at least one fingerprint information stems. Then, this second set of tuning parameters may for instance be provided to the second apparatus by the first apparatus the next time, e.g. a further at least one fingerprint information that is accompanied by this set of tuning parameters (which is then referred to as the first set of tuning parameters) is sent. This (now viewed as a first) set of tuning parameters is considered when determining a new set of tuning parameters so that the determined set of tuning parameters can iteratively converge. In this way, one or more iterations can be performed and/or controlled. With every iteration performed and/or controlled, the bias of the determined (second) set of tuning parameters may for instance be smaller since the determined set of tuning parameters converges.

In case of such an iteration is performed and/or controlled, it is mandatory that a first set of tuning parameters is received (by the second apparatus). Otherwise, in case a first set of tuning parameters is not received, the determined second set of tuning parameters may be the first iteration. Since this determined second set of tuning parameters is outputted (e.g. back to the originator, e.g. the at least one first apparatus), in case of another positioning request, this previously determined second set of tuning parameters is then provided to the at least one second apparatus as a new first set of tuning parameters enabling an iteration of the determining of the set of tuning parameters to be performed.

According to an exemplary embodiment of the second exemplary aspect of the present invention, the method further comprises:

determining or trigger determining a location based at least partially on the at least one fingerprint information; and wherein the second set of tuning parameters is further determined based at least partially on the location estimate and a location representation of the location of a device that determined the at least one fingerprint information prior to the receiving of the at least one fingerprint information.

The device that determined the at least one fingerprint information prior to the receiving of the fingerprint information may for instance be the first apparatus.

For instance, the at least one fingerprint information may comprise a representation of the location at which the at least one fingerprint was determined, e.g. by the first apparatus. The location according to the location representation at which the at least one fingerprint was determined, e.g. by the first apparatus, may for instance stem from a GNSS (Global Navigation Satellite System) estimate (e.g. GPS (Global Positioning System), GLONASS (Globalnaja Nawigazionnaja Sputnikowaja Sistema), GALILEO or the like, to name but a few non-limiting examples), some other positioning system (e.g. cellular triangulation), or manual input of the location (e.g. by the user, e.g. using an input device such as a keyboard or touchscreen). Alternatively, the location representation of the location of the device may for instance be received, e.g. together with the at least one fingerprint information to name but one non-limiting example.

The result is that the location of the device (e.g. the first apparatus) that determined the at least one fingerprint information is provided to the second apparatus. In this case, this known location of the first apparatus may for instance be considered when determining the second set of tuning parameters. Since the accurate location is known (at hand since it is comprised by the received at least one fingerprint information), the (e.g. values of the) second set of tuning parameters can be very accurately determined.

For instance, for determining the second set of tuning parameters, this second set of tuning parameters can be adjusted until the determined location estimate matches the location provided (e.g. since it is comprised by the fingerprint information that is received).

The location, e.g. of the first apparatus, may for instance be determined based at least partially on one or more respective measurements comprised by or represented by the at least one fingerprint information. For instance, the determining of the location may be triggered (e.g. by sending a request) to a radio map provision server so that that at least one fingerprint information respectively information comprised by the at least one fingerprint information may for instance be compared to those comprised by the radio map. In this way, the location of the first apparatus that has determined the at least one fingerprint information may for instance be determined (e.g. estimated).

Indoor positioning and/or floor detection may for instance be performed and/or controlled based on such a radio map.

Such a radio map may be understood to represent an area of a pre-determined environment within which the cellular and/or non-cellular radio networks are expected to support e.g. mobile terminals to get their positions estimated. Additionally or alternatively, the radio map may be defined by an environment and/or an area within which the cellular and/or non-cellular radio networks are capable to support e.g. mobile terminals to estimate their positions.

The (e.g. expected) radio coverage associated with the one or more beacon devices may describe (e.g. define) the area within which a radio signal (e.g. the one or more beacon signals sent by the one or more beacon devices) transmitted or triggered to be transmitted by the one or more beacon devices are (e.g. expected to be) observable (e.g. receivable with a minimum quality).

For instance, the radio map may contain or represent a respective radio coverage model for each radio node of the non-cellular radio network. Therein, a radio coverage model for a respective radio node may for instance be understood to represent the expected radio coverage associated with this radio node.

Based on the radio map, it may for instance be determined, whether certain identifier information of the one or more radio nodes are expected to be observable. For instance, the radio map may comprise information indicative of any position within the coverage area covered by the radio map at which (e.g. different) one or more signals or a number of different signals are expected to be observable. Such information may for instance be gathered, and then a corresponding radio map comprising the gathered information may be generated.

The radio map may for instance be provided for use by one or more mobile terminals to estimate their positions at least partially based on this radio map. A radio map may represent an estimate of a two-dimensional or a three-dimensional coverage map. It may describe (e.g. define) the expected radio coverage of a respective radio node of the non-cellular radio network and/or the expected radio coverage of a cell of the cellular radio network within which one or more signals transmitted or triggered to be transmitted by the entities (e.g. installed at an installation position) of the cellular and/or non-cellular radio network are expected to be observable. The real radio coverage of the respective entities may however deviate from such an expected radio coverage.

A radio coverage model may be a hard-boundary or a soft-boundary model (e.g. a hard-boundary model or a soft-boundary model describing an expected radio coverage).

An example for a soft-boundary radio coverage model may be a parametric radio model. Data of such a parametric radio model may be considered to be data which enables determination of one or more characteristics of one or more signals transmitted or triggered to be transmitted by a respective entity of the cellular and/or non-cellular radio network that are expected to be observable at different positions. For example, data of such a parametric radio model may represent radio transmission parameters of the parametric radio model. Using radio transmission parameters of the parametric radio model may have the effect that the required amount of data for defining the one or more characteristics of one or more signals may be particularly small. An example of a parametric radio model is a path loss model for radio signals (e.g. beacon signals of BT- and/or BLE beacons) transmitted or triggered to be transmitted by a respective beacon. In this case, the radio transmission parameters may comprise a path loss exponent and an indication of a transmission power used by the transmitter of the respective beacon. Based on data of a parametric radio model, an expected radio coverage of a respective beacon installed at a (potential) installation position may be determined.

Radio transmission parameters of a parametric radio model of a respective beacon may at least partially be determined (e.g. derived or selected or calculated) based at least partially on one or more observation reports. For example, the radio transmission parameters of a parametric radio model of a radio positioning support device may at least partially correspond to and/or determined based on one or more radio transmission parameters associated with the respective beacon, wherein the one or more radio transmission parameters associated with this beacon may for example be represented by and/or contained in the one or more observation reports (e.g. one or more observation reports associated with the beacon and/or an (e.g. adjacent) beacon of the non-cellular radio network).

In case different values are determined for a radio transmission parameter based on one or more radio transmission parameters represented by and/or contained in the one or more observation reports, a mean value (e.g. an arithmetic mean value or a median mean value) may for example be used as value for this radio transmission parameter. Alternatively, one value of the different values may be selected according to a pre-determined rule to be used for as value for this radio transmission parameter (e.g. the lowest or highest value may be used as value for this radio transmission parameter).

As disclosed above, an indication of a transmission power e.g. of a radio node of the non-cellular radio network and an indication of one or more (received) signal strength values for a signal of the one or more radio nodes of the non-cellular radio network may be referred to as radio transmission parameters. A radio transmission parameter may be understood to be associated with a respective radio node if the radio transmission parameter describes a feature (e.g. a physical quantity) of a radio signal transmitted or triggered to be transmitted by this radio node, for example if the radio transmission parameter indicates a transmission power of this radio node and/or if the radio transmission parameter indicates a (received) signal strength value for a signal transmitted or triggered to be transmitted by this radio node.

If the installation positions of the one or more radio nodes and, thus, also the distances between the one or more radio nodes and/or the base stations of the cells of the cellular radio network are known, such radio transmission parameters may for example be used to determine (e.g. calculate) further radio transmission parameters for a parametric radio model like e.g. a path loss exponent.

An example for a hard-boundary radio coverage model may be a geometric model. Data of such a geometric radio model may be considered to be data which (e.g. geometrically) describe (e.g. define) an expected radio coverage of a radio node of the non-cellular radio network and/or a base station of a cell of the cellular radio network (e.g. installed at an installation position).

For instance, a terrestrial transmitter (e.g. comprised by or represented by a beacon) based positioning at a particular site (e.g. in the venue) may be based on radio maps, which allow determining for instance which received signal strength values of which transmitters can be expected at various locations of the particular site. For instance, for making use of a positioning service, the first apparatus (e.g. a mobile terminal) may detect signals broadcast by a plurality of beacons and measure their signal strengths. The first apparatus may sent the results of the measurements along with identifier information of the beacons accompanied by a positioning request to the second apparatus, e.g. a radio map and positioning server. An identifier may be for instance in the form of a service set identifier (SSID), a universally unique identifier (UUID) (e.g. according to Eddystone- or iBeacon-specification) and the results of measurements may be for instance in the form of a received signal strength indicator (RSSI). The radio map and positioning server may evaluate the signals taking account data stored in radio maps and returns a position (e.g. in the form of coordinates) that are consistent with the measured signal strengths of the plurality of beacons.

The location estimate of the location of the first apparatus may for instance be determined further based at least partially on such a radio map, wherein in particular the location of the first apparatus is estimated by a comparison of the one or more signal strength values comprised by or represented by the at least one fingerprint information, or in particular comprised by or represented by the at least one fingerprint information, with those of the radio map. Further, the determined (second) set of tuning parameters may for instance be used to correct (e.g. change) the determined location estimate. As a result of such a correction based on the determined (second) set of tuning parameters, the determined location estimate matches closer the actual location respectively position of the apparatus (e.g. the first apparatus) that determined the at least one fingerprint information. This determined at least one fingerprint information may then be provided to another apparatus, wherein the determined at least one fingerprint information may for instance be comprised by a positioning request. The at least one fingerprint information may for instance be used to determine the location estimate, as described above.

According to an exemplary embodiment of the second exemplary aspect of the present invention, the at least one fingerprint information is relayed by a third apparatus to the second apparatus, wherein the third apparatus comprises or is connectable to a memory comprising one or more sets of tuning parameters, wherein the at least one fingerprint information is relayed together with a corresponding set of tuning parameters to the second apparatus.

In this case, the third apparatus, e.g. a so-called auxiliary server, is used. The second apparatus may for instance be kept clean since one or more steps of the method according to the second exemplary aspect are performed and/or controlled by the third apparatus. For instance, the first apparatus that determined the at least one fingerprint information prior to the receiving of this at least one fingerprint information, may be in communication with this third apparatus only. In this case, the determined second set of tuning parameters is output to this third apparatus. Upon reception, the third apparatus may for instance store the received (second) set of tuning parameters in the memory.

The memory may for instance be a database. The database may for instance store one or more sets of tuning parameters. Each of the one or more sets of tuning parameters may for instance be associated with a certain device (e.g. the first apparatus). For instance, each of the stored sets of tuning parameters may be associated with a device identifier enabling a device (e.g. the first apparatus) to be identified. Such a device identifier may for instance be a MAC (Media Access Control) address, to name but one non-limiting example.

Further, a system according to the third exemplary aspect of the present invention may for instance comprise such a third apparatus as disclosed above.

According to an exemplary embodiment of the second exemplary aspect of the present invention, the determined second set of tuning parameters is outputted only in case the determined second set of tuning parameters differs from the first set of tuning parameters in case such a first set of tuning parameters is received.

In this way, necessary data traffic may be minimized.

According to an exemplary embodiment of all aspects of the present invention, the second apparatus is or is part of server or a server cloud.

The second apparatus, receiving the positioning request, may for instance be a radio map and positioning server. Upon receiving the positioning request, the server may for instance perform and/or controlled the method according to the second exemplary aspect of the present invention.

The features and example embodiments of the invention described above may equally pertain to the different aspects according to the present invention.

It is to be understood that the presentation of the invention in this section is merely by way of examples and non-limiting.

Other features of the invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

DETAILED DESCRIPTION OF SOME EXEMPLARY EMBODIMENTS

The following description serves to deepen the understanding of the present invention and shall be understood to complement and be read together with the description as provided in the above summary section of this specification.

Figure 1:
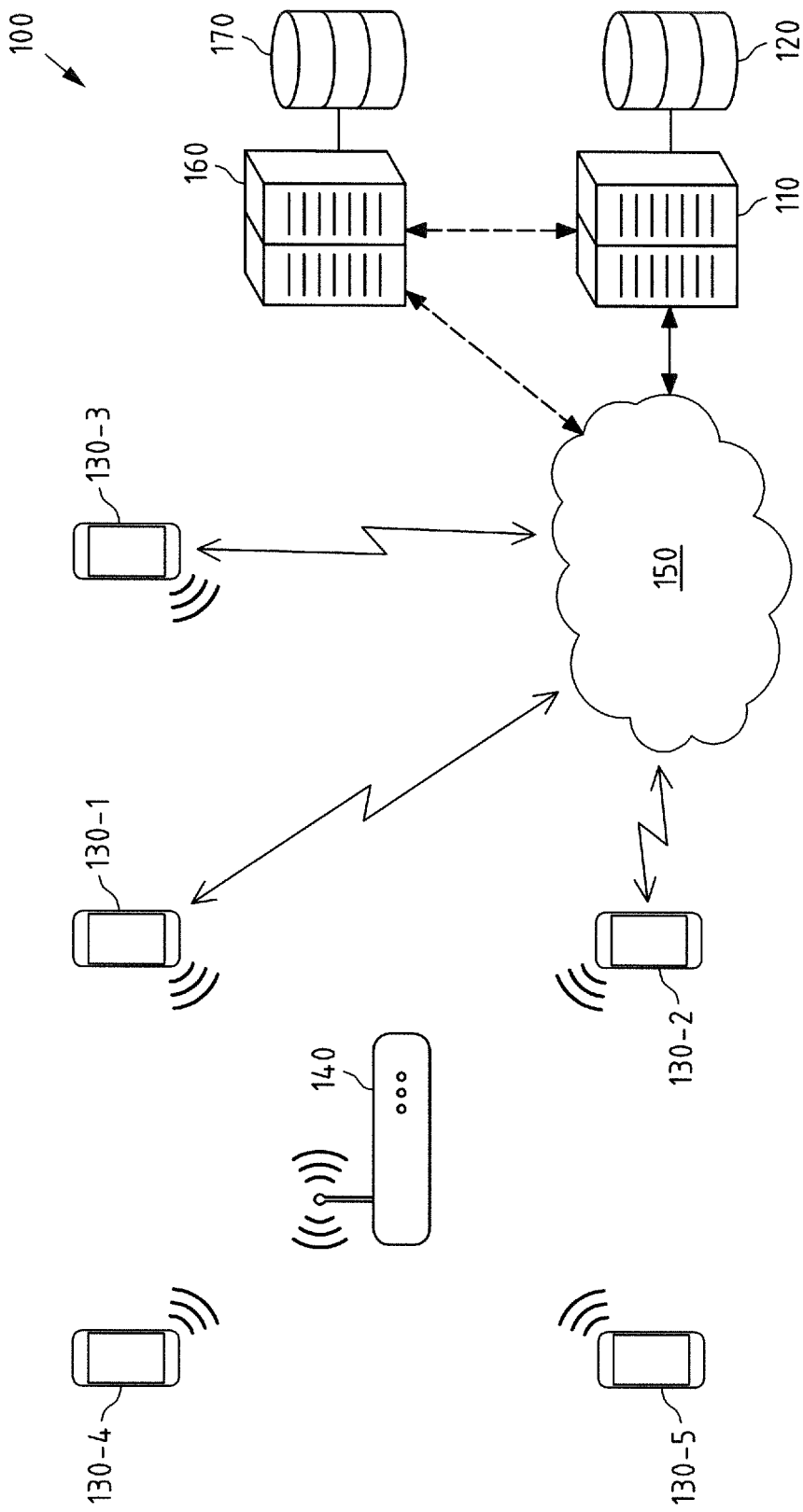
FIG. 1 a schematic block diagram of an example embodiment of a system according to the third exemplary aspect of the present invention.

FIG. 1 shows a schematic high-level block diagram of a system according to the third exemplary aspect of the present invention.

System 100 comprises a server 110, and an optional database 120. Database 120 may be comprised by or connected to the server 110, e.g. via a communication network (e.g. the Internet to name but one non-limiting example). The server 110 may be configured to perform and/or control an example method according to the second exemplary aspect of the present invention. Alternatively, server 110 may for instance be embodied as a server cloud, e.g. at least two servers providing services together, and being connected to each other, e.g. via a communication network, e.g. the Internet.

System 100 comprises a radio node 140 (e.g. according to WLAN, BT or BLE communication standard). Thus, radio node 140 may for instance be a WLAN access point or BT- and/or BLE-beacon. System 100 may for instance comprise a plurality of such radio node 140 (not shown in FIG. 1).

System 100 further comprises a cellular network 150 (e.g. according to GSM, WCDMA, TD-SCDMA, LTE, LTE-A, or CDMA communication standard, to name but a few non-limiting examples).

System 100 comprises a plurality of mobile terminals 130, at hand five different mobile terminals 130-1 to 130-5. Each of the mobile terminals 130 may be configured to perform and/or control an example method according to the first exemplary aspect of the present invention.

Mobile terminals 130-1 and 130-2 may receive one or more signals sent by the cellular network 150, in particular of a base station a cell (not shown in FIG. 1) of the communication network 150 as well as one or more signals sent by radio node 140. In contrast, mobile terminal 130-3 may receive one or more signals sent by cellular network 150, only. Further, mobile terminals 130-4 and 130-5 may receive one or more signals sent by radio node 140, only.

Each of the mobile terminals 140 may for instance be or comprise a memory. The memory may for instance store a set of tuning parameters. Further, the memory may for instance store at least one fingerprint information, e.g. gathered by each of the mobile terminals 130 based at least partially on one or more signals sent by one or more radio nodes, e.g. radio node 140, and/or one or more cells (not shown in FIG. 1) of cellular network 150. Each of the mobile terminals 130 may for instance comprise one or more means (e.g. a sensor, a transceiver, a receiver, a sender, or a combination thereof, e.g. a sender and a receiver) for a communication with the radio node 140, with the cellular network 150, with the server 110, e.g. via another communication network (not shown in FIG. 1, e.g. the Internet). The server 110 may for instance comprise one or more means (e.g. a transceiver, a receiver, a sender, or a combination thereof, e.g. a sender and a receiver) for a communication with the mobile devices 130, e.g. via the cellular network 150, or via the Internet (not shown in FIG. 1), to name but a few non-limiting examples.

Communication between the mobile terminals 130, and the server 110 may for instance take place at least partially in a wireless fashion, e.g. based on cellular communication (e.g. via cellular network 150), or on WLAN- and/or BT- and/or BLE-based communication, to name but a few non-limiting examples. Further, mobility of the mobile terminals 130 can be guaranteed by employing wireless-based communication.

The databases 120 or 170 may for instance be or comprise a respective memory. The memory of the database 120 may for instance store one or more pieces of identifier information enabling uniquely identifying one or more radio nodes, e.g. radio node 140, and/or one or more cells of a cellular network, e.g. cells (not shown in FIG. 1) of cellular network 150. Further, the memory of the database 170 may for instance store one or more one or more sets of tuning parameters. Further, the memory of the database 170 may for instance store one or more positioning information (e.g. one or more location representations) respectively indicative of a location respectively position of a respective mobile terminal 130. The one or more positioning information may for instance comprise or at least be associated with a time stamp so that a history of the respective location of a respective mobile terminal 130 is stored.

Further, the system 100 may optionally comprise an auxiliary server 160. The auxiliary server 160 may for instance comprise or be connectable to the database 170.

For instance, a positioning request sent by at least one of the mobile terminals 130 may be sent to the auxiliary server (instead of the (e.g. positioning server 110)). Upon reception of such a positioning request, the auxiliary server 160 may for instance relay the positioning request, or the at least one fingerprint information or at least a part thereof (e.g. one or more signals strength values), and optionally a set of tuning parameters (e.g. either a set of tuning parameters comprised by or accompanying the positioning request, or a set of tuning parameters stored in the database 170 which is acquired prior to the relaying by the server 160), e.g. to the server 110. Then, the server 110 may for instance determine a location estimate, e.g. based at least partially on the one or more signal strength values and the set of tuning parameters. This determined location estimate may be provided (e.g. transmitted) as a response from the server 110 to the auxiliary server 160. Further, the server 110 may provide (e.g. transmit) another determined set of tuning parameters (e.g. iteratively updated based at least partially on the set of tuning parameters that the server 110 received together with the relayed information (e.g. at least one fingerprint information and the set of tuning parameters) to the auxiliary server 160. Then, the auxiliary server 160 may provide the location estimate to the mobile terminal 130 that e.g. requested its location to be determined by transmitted the positioning request, in case the mobile terminal 130 has requested to be provided with the determined location estimate. Further, the auxiliary server 160 may for instance provide in each and every case the "new" determined set of tuning parameters to the mobile terminal 130 from that the positioning request is received in the beginning. Additionally or alternative, the auxiliary server 160 may for instance store the set of tuning parameters that it has received from the server 110, in the database 170.

The additional usage of such an auxiliary server 160 may be an alternatively to using only the server 110. In FIG. 1, this alternative is schematically shown by the dotted lines between the communication network 150 and the auxiliary server 160, and between the auxiliary server 160 and the server 110.

Figure 2:
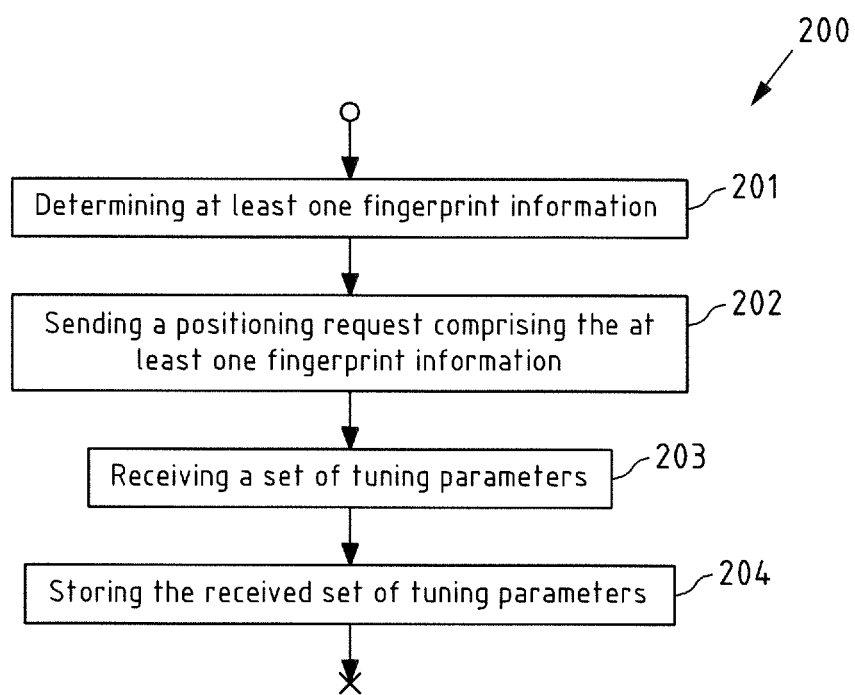
FIG. 2 a flow chart illustrating an example operation, e.g. in the at least one apparatus, e.g. according to FIG. 4, of an example method according to the first exemplary aspect of the present invention.
Figure 4:
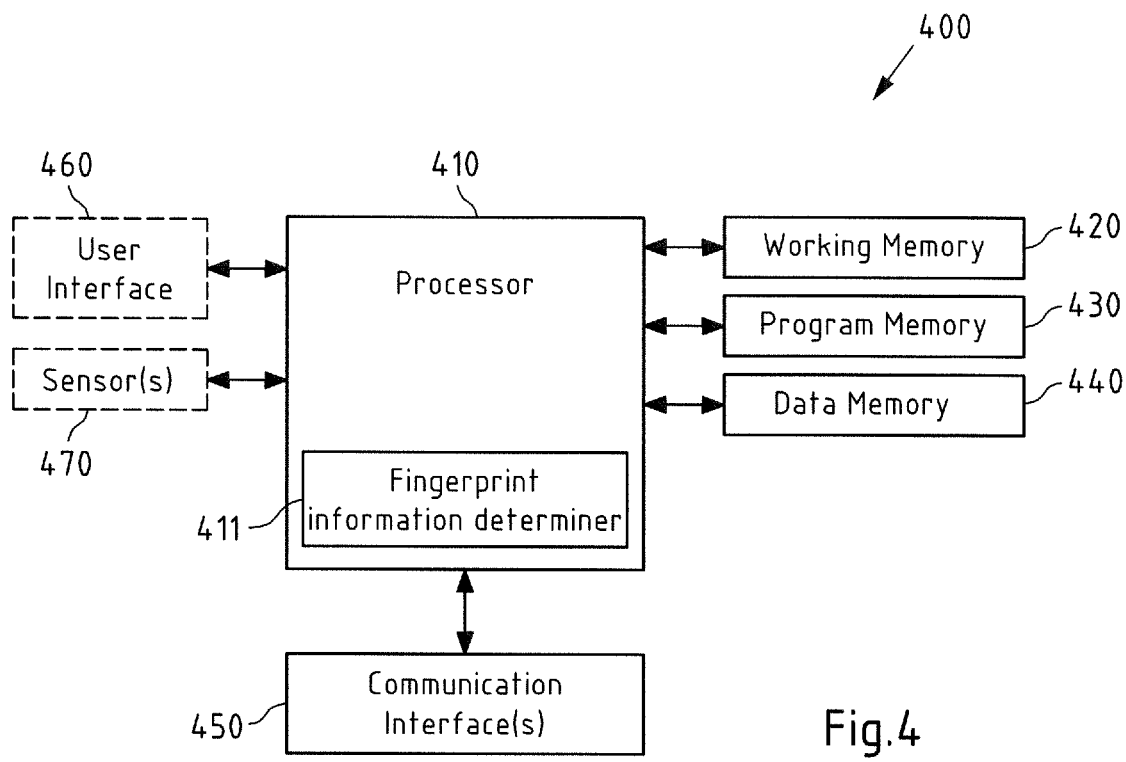
FIG. 4 a schematic block diagram of an example embodiment of an apparatus according to the present invention.

FIG. 2 shows a flow chart 200 illustrating an example operation, e.g. in the first apparatus, e.g. according to FIG. 4, of an example method according to the first exemplary aspect of the present invention.

This flow chart 200 may for instance be performed by an electronic device, e.g. mobile terminal 130 of FIG. 1.

In a first step 201, at least one fingerprint information is determined. The at least one fingerprint information is indicative of at least one identifier of a cellular and/or a non-cellular network, e.g. enabling identification of a (specific) cell of the cellular network, and/or enabling identification of a radio node (e.g. a WLAN access point, or a BT- and/or BLE-beacon). For determining the at least one fingerprint information, one or more signals sent by the cellular and/or non-cellular network are gathered, e.g. by at least one sensor of the mobile terminal 130 of FIG. 1. The one or more signals may for instance be so-called advertisement packets sent by the radio node (e.g. the BT- and/or BLE-beacon) by broadcast and periodically. Such an advertisement packet may for instance comprise or represent an identifier of the radio node that sent the advertisement packet. Further, the at least one fingerprint information may for instance comprise or represent at least partially one or more signal strength values. Those one or more signal strength values may for instance be determined based at least partially on the one or more signals sent by the cellular and/or non-cellular network. The one or more signals may for instance be sent by at least one cell of the cellular radio network and/or by at least one (radio) node of the non-cellular radio network. At present, each of the one or more signal strength values is indicative of a signal strength of the one or more signals that are observable at the location at which the one or more signals are gathered (e.g. measured by the at least one sensor) In a second step 202, a positioning request comprising the at least one fingerprint information is sent, e.g. to the server 110 of FIG. 1. The positioning request comprising the at least one fingerprint information may for instance be transmitted to the server 110 via a cellular network, e.g. cellular network 150 of FIG. 1, or another communication network, e.g. the Internet. Alternatively, only the at least one fingerprint information is sent, e.g. to the server 110 of FIG. 1.

In a third step 203, a set of tuning parameters is received, e.g. from the server 110 of FIG. 1. The set of tuning parameters may for instance be transmitted to the mobile terminal 130 of FIG. 1 from the server 110 of FIG. 1, e.g. via a cellular network, e.g. cellular network 150 of FIG. 1, or another communication network, e.g. the Internet.

In a fourth step 204, the received set of tuning parameters is stored, e.g. in a memory comprised by or being connectable to the mobile terminal 130 that received the set of tuning parameters. The stored set of tuning parameters may for instance be comprised by another positioning request (see step 202) sent subsequently to a first positioning request, or may be accompanying the other positioning request sent subsequently to a first positioning request.

Figure 3:
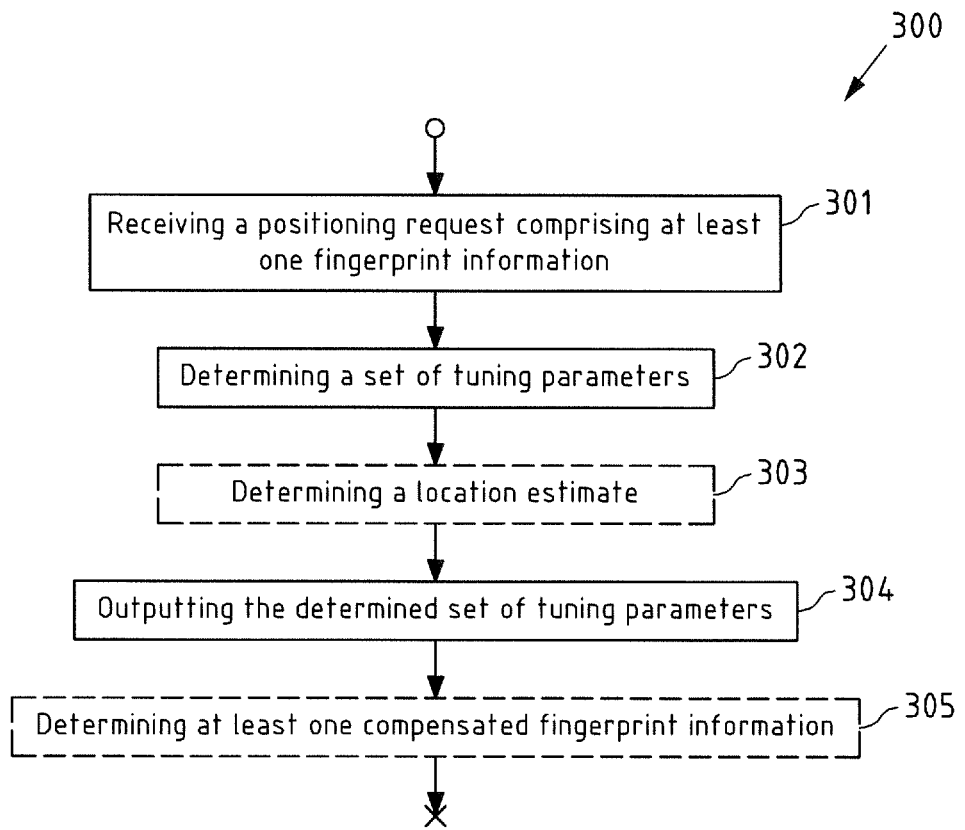
FIG. 3 a flow chart illustrating an example operation, e.g. in the at least one apparatus, e.g. according to FIG. 5, of an example method according to the second exemplary aspect of the present invention.
Figure 5:
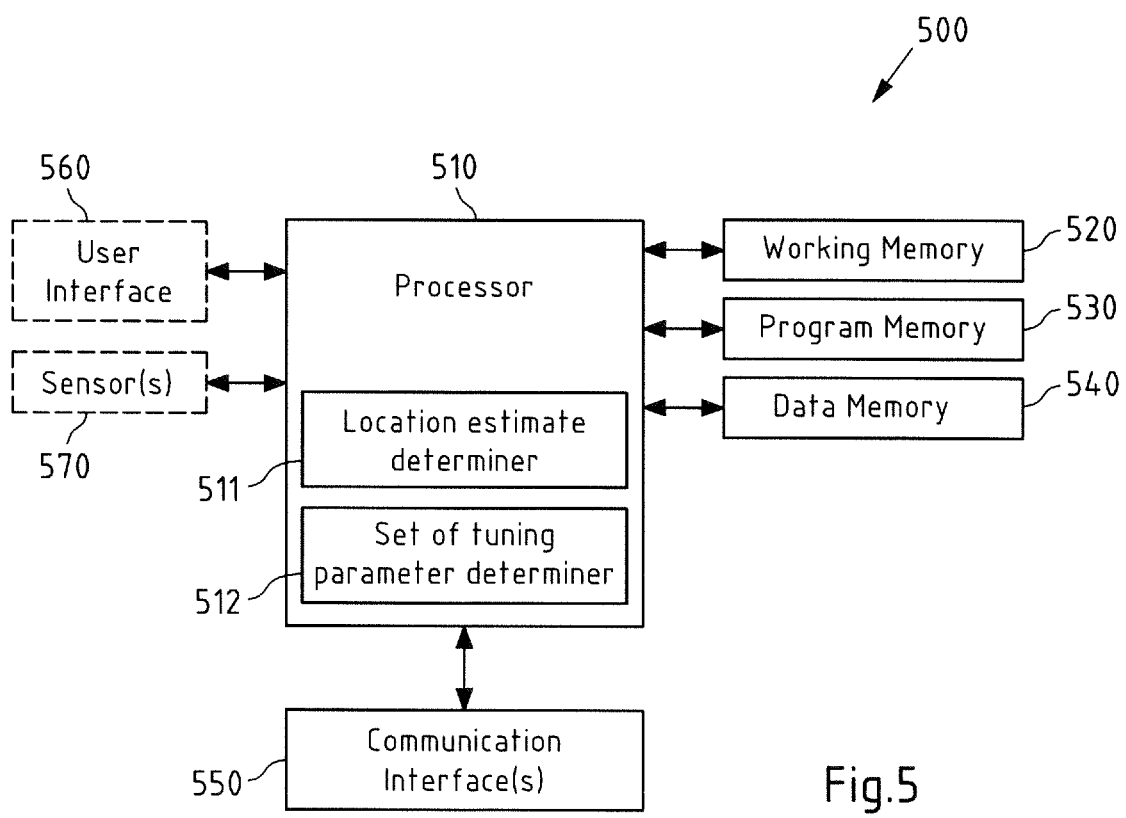
FIG. 5 a schematic block diagram of an example embodiment of another apparatus according to the present invention.

FIG. 3 shows a flow chart 300 illustrating an example operation, e.g. in the second apparatus, e.g. according to FIG. 5, of an example method according to the second exemplary aspect of the present invention.

This flow chart 300 may for instance be performed by a server or a server cloud, e.g. server 110 of FIG. 1.

In a first step 301, a positioning request comprising at least one fingerprint information is received. The at least one fingerprint information that is received may for instance stem from a mobile terminal 130 of FIG. 1. The received at least one fingerprint information may for instance be transmitted via a cellular network, e.g. cellular network 150 of FIG. 1, or another communication network, e.g. the Internet from such a mobile terminal 130 of FIG. 1 to the server 110 of FIG. 1.

In a second step 302, a set of tuning parameters is determined. The set of tuning parameter may for instance be used to enable an accurate determining of location estimates representing locations of mobile terminals (e.g. mobile terminals 130 of FIG. 1), e.g. in a venue. For instance, due to a different size and position of antenna(s) of the mobile terminals 130 of FIG. 1, possible interference of other radios on-board of mobile terminals 130 of FIG. 1, to name but a few non-limiting examples, different mobile terminals 130 of FIG. 1 lead to (see step 202 of FIG. 2) different determined fingerprint information in the same circumstance, even if mobile terminals 130 of FIG. 1 of the same model are used. Thus, the determined set of tuning parameters enables to determine (e.g. calculate) accurate location estimates of mobile terminals.

In an optional third step 303, a location estimate is determined based at least partially on at least one fingerprint information and the determined set of tuning parameters. Additionally or alternatively, the step 303 may be performed and/or controlled after optional step 305, wherein at least one compensated fingerprint is determined taking into account the specific set of tuning parameters for the mobile terminal from which the received at least one fingerprint information stems. Alternatively, the location estimate may for instance be triggered to be determined, e.g. another server (not shown in FIG. 1) is requested to determine the location estimate by the server 110 of FIG. 1. The location estimate represents a location of the mobile terminal 130 of FIG. 1 from that the at least one fingerprint information is received in step 301.

In a fourth step 304, the determined set of tuning parameters is output, e.g. to the mobile terminal 130 of FIG. 1 from which the positioning request is received in step 301, or to another entity that transfers (e.g. relays) the determined set of tuning parameters to the mobile terminal from which the received positioning request is received in step 301.

In an optional fifth step 305, at least one compensated fingerprint information is determined. The at least one compensated fingerprint information is determined based at least partially on the received at least one fingerprint (e.g. that was comprised by or accompanying the received positioning request (see step 301)) and the determined set of tuning parameters (see step 302). For instance, for determining a location estimate, e.g. based on a radio map, the at least one fingerprint information may be used and compared to those corresponding values of the radio map. The determined position respectively location may then be compensated by the set of tuning parameters to achieve the most accurate location estimate. Alternatively, the set of tuning parameters may for instance be used to compensate the at least one fingerprint information, and then use this fingerprint information to determine a location estimate based on the radio map.

FIG. 4 is a schematic block diagram of an apparatus 400 according to an exemplary aspect of the present invention, which may for instance represent the mobile terminal 130 of FIG. 1.

Apparatus 400 comprises a processor 410, working memory 420, program memory 430, data memory 440, communication interface(s) 450, an optional user interface 460 and an optional sensor(s) 470.

Apparatus 400 may for instance be configured to perform and/or control or comprise respective means (at least one of 410 to 470) for performing and/or controlling the method according to the first exemplary aspect of the present invention. Apparatus 400 may as well constitute an apparatus comprising at least one processor (410) and at least one memory (420) including computer program code, the at least one memory and the computer program code configured to, with the at least one processor, cause an apparatus, e.g. apparatus 400 at least to perform and/or control the method according to the first exemplary aspect of the present invention.

Processor 410 may for instance comprise a fingerprint information determiner 411 as a functional and/or structural unit. Fingerprint information determiner 411 may for instance be configured to determine at least one fingerprint information (see step 201 of FIG. 2). Processor 410 may for instance further control the memories 420 to 440, the communication interface(s) 450, the optional user interface 460 and the optional sensor(s) 470.

Processor 410 may for instance execute computer program code stored in program memory 430, which may for instance represent a computer readable storage medium comprising program code that, when executed by processor 410, causes the processor 410 to perform the method according to the first exemplary aspect of the present invention.

Processor 410 (and also any other processor mentioned in this specification) may be a processor of any suitable type. Processor 410 may comprise but is not limited to one or more microprocessor(s), one or more processor(s) with accompanying one or more digital signal processor(s), one or more processor(s) without accompanying digital signal processor(s), one or more special-purpose computer chips, one or more field-programmable gate array(s) (FPGA(s)), one or more controller(s), one or more application-specific integrated circuit(s) (ASIC(s)), or one or more computer(s). The relevant structure/hardware has been programmed in such a way to carry out the described function. Processor 410 may for instance be an application processor that runs an operating system.

Program memory 430 may also be included into processor 410. This memory may for instance be fixedly connected to processor 410, or be at least partially removable from processor 410, for instance in the form of a memory card or stick. Program memory 430 may for instance be non-volatile memory. It may for instance be a FLASH memory (or a part thereof), any of a ROM, PROM, EPROM and EEPROM memory (or a part thereof) or a hard disc (or a part thereof), to name but a few examples. Program memory 430 may also comprise an operating system for processor 410. Program memory 430 may also comprise a firmware for apparatus 400.

Apparatus 400 comprises a working memory 420, for instance in the form of a volatile memory. It may for instance be a Random Access Memory (RAM) or Dynamic RAM (DRAM), to give but a few non-limiting examples. It may for instance be used by processor 410 when executing an operating system and/or computer program.

Data memory 440 may for instance be a non-volatile memory. It may for instance be a FLASH memory (or a part thereof), any of a ROM, PROM, EPROM and EEPROM memory (or a part thereof) or a hard disc (or a part thereof), to name but a few examples. Data memory 440 may for instance store a set of tuning parameters (e.g. a first set of tuning parameters (see step 202 of FIG. 2) and/or a second set of tuning parameters (see step 204 of FIG. 2)).

Communication interface(s) 450 enable apparatus 400 to communicate with other entities, e.g. with server 110 of FIG. 1 or with radio node 140 of FIG. 1. The communication interface(s) 450 may for instance comprise a wireless interface, e.g. a cellular radio communication interface and/or a WLAN, BT and/or BLE interface) and/or wire-bound interface, e.g. an IP-based interface, for instance to communicate with entities via the Internet.

User interface 460 is optional and may comprise a display for displaying information to a user and/or an input device (e.g. a keyboard, keypad, touchpad, mouse, etc.) for receiving information from a user.

Sensor(s) 470 are optional and may for instance comprise a barometric sensor, e.g. to gather pressure information.

Some or all of the components of the apparatus 400 may for instance be connected via a bus. Some or all of the components of the apparatus 400 may for instance be combined into one or more modules.

FIG. 5 is a schematic block diagram of an apparatus 500 according to an exemplary aspect of the present invention, which may for instance represent server 110 of FIG. 1.

Apparatus 500 comprises a processor 510, working memory 520, program memory 530, data memory 540, communication interface(s) 550, an optional user interface 560 and an optional sensor(s) 570.

Apparatus 500 may for instance be configured to perform and/or control or comprise respective means (at least one of 510 to 570) for performing and/or controlling the method according to the second exemplary aspect of the present invention. Apparatus 500 may as well constitute an apparatus comprising at least one processor (510) and at least one memory (520) including computer program code, the at least one memory and the computer program code configured to, with the at least one processor, cause an apparatus, e.g. apparatus 500 at least to perform and/or control the method according to the second exemplary aspect of the invention of the present invention.

Processor 510 may for instance comprise a location estimate determiner 511 as a functional and/or structural unit. Location estimate determiner 511 may for instance be configured to determine location estimate based at least partially on at least one fingerprint information (see step 302 of FIG. 3). Processor 510 may for instance comprise a set of tuning parameter determiner 512 as a functional and/or structural unit. Set of tuning parameter determiner 512 may for instance be configured to determine a set of tuning parameters (see step 303 of FIG. 3). Processor 510 may for instance further control the memories 520 to 540, the communication interface(s) 550, the optional user interface 560 and the optional sensor(s) 570.

Processor 510 may for instance execute computer program code stored in program memory 530, which may for instance represent a computer readable storage medium comprising program code that, when executed by processor 510, causes the processor 510 to perform the method according to the second exemplary aspect of the present invention.

Processor 510 (and also any other processor mentioned in this specification) may be a processor of any suitable type. Processor 510 may comprise but is not limited to one or more microprocessor(s), one or more processor(s) with accompanying one or more digital signal processor(s), one or more processor(s) without accompanying digital signal processor(s), one or more special-purpose computer chips, one or more field-programmable gate array(s) (FPGA(s)), one or more controller(s), one or more application-specific integrated circuit(s) (ASIC(s)), or one or more computer(s). The relevant structure/hardware has been programmed in such a way to carry out the described function. Processor 510 may for instance be an application processor that runs an operating system.

Program memory 530 may also be included into processor 510. This memory may for instance be fixedly connected to processor 510, or be at least partially removable from processor 510, for instance in the form of a memory card or stick. Program memory 530 may for instance be non-volatile memory. It may for instance be a FLASH memory (or a part thereof), any of a ROM, PROM, EPROM and EEPROM memory (or a part thereof) or a hard disc (or a part thereof), to name but a few examples. Program memory 530 may also comprise an operating system for processor 510. Program memory 530 may also comprise a firmware for apparatus 500.

Apparatus 500 comprises a working memory 520, for instance in the form of a volatile memory. It may for instance be a Random Access Memory (RAM) or Dynamic RAM (DRAM), to give but a few non-limiting examples. It may for instance be used by processor 510 when executing an operating system and/or computer program.

Data memory 540 may for instance be a non-volatile memory. It may for instance be a FLASH memory (or a part thereof), any of a ROM, PROM, EPROM and EEPROM memory (or a part thereof) or a hard disc (or a part thereof), to name but a few examples. Data memory 540 may for instance store at least one fingerprint information, e.g. for determining a location estimate (see step 302 of FIG. 3) and/or for determining a set of tuning parameters (see step 303 of FIG. 3), and/or for determining at least one compensated fingerprint information (see step 305 of FIG. 3). Further, data memory 540 may for instance store one or more generated radio maps (see step 306 of FIG. 3).

Communication interface(s) 550 enable apparatus 500 to communicate with other entities, e.g. with at least one of the mobile terminals 130 of FIG. 1, in particular with all of the mobile terminals 130 of FIG. 1. The communication interface(s) 550 may for instance comprise a wireless interface, e.g. a cellular radio communication interface and/or a WLAN interface) and/or wire-bound interface, e.g. an IP-based interface, for instance to communicate with entities, e.g. with database 120 of FIG. 1, via the Internet.

User interface 560 is optional and may comprise a display for displaying information to a user and/or an input device (e.g. a keyboard, keypad, touchpad, mouse, etc.) for receiving information from a user.

Sensor(s) 570 are optional and may for instance comprise a barometric sensor, e.g. to gather pressure information.

Some or all of the components of the apparatus 300 may for instance be connected via a bus. Some or all of the components of the apparatus 300 may for instance be combined into one or more modules.

The following embodiments shall also be considered to be disclosed:

Radio sensor readings in a client vary, for example due to the different size and position of antenna(s), possible interference of other radios on-board, different firmware, different hardware tuning parameter values, cover materials, or the like to name but a few non-limiting examples. In other words, different devices report different radio sensor readings in the same circumstance—there may be differences even between units of the same device model in those tuning parameter values.

One solution is that a service (e.g. provided by a server) stores such tuning parameter values for each device.

One other solution is to move the storing of such tuning parameter values from the service to the client(s). The tuning parameter values—also referred to as set of tuning parameters—can be a "black box" (also referred to as "parameter box") from the client(s) perspective. For instance, the client(s) don't need to know which parameters it stores, which values they have, or the like. Instead, the service defines the parameters, their semantics, etc., and the client(s) handles them as a black box. This way, the service can freely add new tuning parameters, and upgrade the existing ones, without any change needed in the client side.

When the client device makes the first request, it does not supply the parameter box to the service. The service calculates the initial parameter values, and sends them within the parameter box to the client in the response, and client stores the parameter box. When the client makes subsequent requests, it includes the current parameter box in the request, and receives the new parameter box in the response and stores it locally (replacing the current with the new). Note: The content of the parameter value may or may not have changed—the client does not need to know it.

When there is an operating system upgrade, physical change (e.g. a new cover of the device) or similar event in the device, which may change the (e.g. radio) sensor readings, the device should erase the parameter box from its memory, and trigger parameter reset by omitting the parameter box in the next request it makes to the service.

Figure 6:
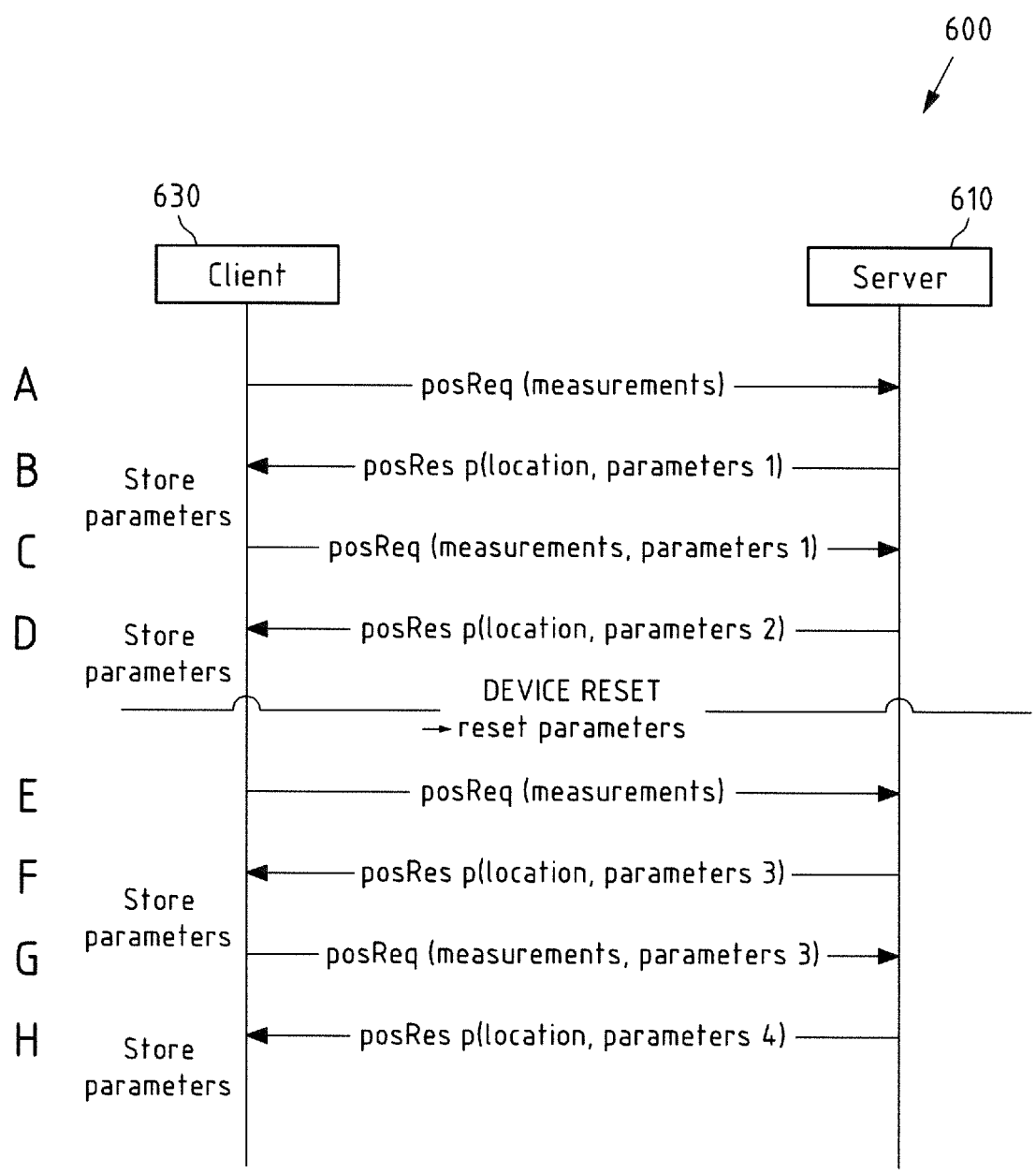
FIG. 6 a flow chart illustrating an exemplary flow of information between an apparatus, e.g. according to FIG. 4, and another apparatus, e.g. according to FIG. 5, according to the present invention.

The flowchart 600 of FIG. 6 shows an exemplary flow of the aforementioned.

The abbreviation "posReq" as used in FIG. 6 is referring to a positioning request. The reference thereinafter in the brackets may for instance refer to information, e.g. at least one fingerprint information, comprised by or accompanying the positioning request. The abbreviation "posResp" as used in FIG. 6 is referring to a response that is transmitted with respect to previously received positioning request. Such a response may for instance be the sending of a set of tuning parameters from the second apparatus to the first apparatus. Further, the reference "measurements" may for instance refer to at least one fingerprint information, and the reference "parameters" may for instance refer to a (first or second) set of tuning parameters, as described in the aforementioned SUMMARY OF SOME EXEMPLARY EMBODIMENTS section.

In step A, the client makes the first positioning request. There are e.g. just the WiFi measurements in the request.

In step B, the server returns the location estimate as well as the tuning parameters. The client stores the tuning parameters.

In step C, the client makes a new positioning request. The client provides not only the radio measurements, but also the stored parameters.

In step D, the server returns the location estimate as well as the possibly updated tuning parameters. The client stores the possibly updated tuning parameters.

In step E, after the device (of the client) is reset (e.g. due to a firmware update), the client makes a new positioning request. The client does not provide prior tuning parameters to the server as the parameters may have changed significantly.

In step F, the server returns the location estimate as well as the tuning parameters. The client stores the tuning parameters.

In step G, the client makes a new positioning request. The client provides not only the radio measurements, but also the stored parameters.

In step H, the server returns the location estimate as well as the possibly updated tuning parameters. The client stores the possibly updated tuning parameters.

This may provide the advantage that the server-side does not need to store the tuning parameters, but the responsibility for storing the state is distributed to the client(s). This may require some (minor) implementation effort.

Finding the correct calibration value may for instance be an iterative process. In case of a physical hardware change, and/or a firmware change (e.g. of a client device), a determined calibration value may for instance be totally reset. Further, in particular in the most nominal case, it may for instance take several positioning requests before the calibration value converges. Thus, even when there are no actual changes, it will take multiple requests for the tuning parameters to converge. Thus, there will be back-and-fourth continuously.

Further, calibration with the known location (e.g. of a client device) may be performed and/or controlled. A fingerprint may comprise both accurate location (e.g. from GNSS, some other positioning technique or even a manual input, to name but a few non-limiting examples) and radio measurements. Now, the value of tuning parameter(s) may for instance be determined very accurately, because the correct location that a location estimate tries to determine, is known. Thus, the tuning parameter(s) may for instance be adjusted as long as the provided location information matches with the location estimate (that is e.g. a combination of the radio measurements, radio map and the tuning parameter(s)).

The system according to the third exemplary aspect of the present invention may for instance comprise another apparatus, e.g. another server or server-cloud (e.g. an auxiliary server) that is structurally (e.g. see FIG. 1, dotted lines between communication network 150 and the auxiliary server 160, and between the auxiliary server 160 and the positioning server 110) located between the positioning server (e.g. server 110 of FIG. 1) and the client device(s) (e.g. at least one of the client devices 130 of FIG. 1). This auxiliary server may for instance be a tracking server that keeps record of the time history of the client location. Further, e.g. at the same time, the auxiliary server can hold the client-specific tuning parameters. Thus, the positioning server is still kept "clean", it is just resolving position estimates and returning the tuning parameter(s). The client device itself may for instance be in communication with the auxiliary server, and not the positioning server. The client device may for instance send radio measurements to the auxiliary server, the auxiliary server provides the positioning server the radio measurements and the possible tune parameters (stored in the database in the auxiliary server). Upon response, the auxiliary server stores the tuning parameter(s) and the client location (e.g. for further analysis of movement of the client device or the like, to name but one non-limiting example). It may in fact be that the client location is not returned to the client device to be tracked at all, because on the tracking use cases typically the client device to be tracked (e.g. a tool or equipment) may not be interested in the location, but some outside party.

The following embodiments shall also be considered to be disclosed:

Embodiment 1

A first apparatus comprising at least one processor and at least one memory including computer program code, the at least one memory and the computer program code configured to, with the at least one processor, cause the apparatus to at least perform:

determining at least one fingerprint information indicative of at least one identifier of a cellular and/or a non-cellular radio network, wherein based on the identifier at least one cell of the cellular radio network and/or at least one node of the non-cellular radio network is identifiable; sending the at least one fingerprint information, wherein the at least one fingerprint information comprises or is accompanied by a first set of tuning parameters in case such a set of tuning parameters is stored in a memory;

receiving a second set of tuning parameters in response to the sending of the at least one fingerprint information, wherein the first and/or the second set of tuning parameters respectively comprise a correction value for compensating a bias for the at least one fingerprint information; and storing the received second set of tuning parameters, wherein the first set of tuning parameters is updated with the second set of tuning parameters enabling to iteratively converge the set of tuning parameters to the actual bias.

Embodiment 2

The first apparatus according to embodiment 1, wherein the second set of tuning parameters is stored only in case the first set of tuning parameters is outdated.

Embodiment 3

The first apparatus according to embodiment 1 or embodiment 2, wherein the second set of tuning parameters is received only in case the first set of tuning parameters is outdated.

Embodiment 4

The first apparatus according to any of the preceding embodiments, wherein the at least one fingerprint information does not comprise or is not accompanied by the first set of tuning parameters in case the first set of tuning parameters has changed.

Embodiment 5

The first apparatus according to any of the preceding embodiments, wherein the at least one fingerprint information further comprises or represents one or more signal strength values, wherein each of the one or more signal strength values is indicative of a signal strength of one or more signals observable at the location at which one or more measurements used for determining the at least one fingerprint information are gathered, and wherein the one or more signals are sent by at least one cell of the cellular radio network and/or by at least one radio node of the non-cellular radio network.

Embodiment 6

The first apparatus according to any of the preceding embodiments, the at least one fingerprint information is comprised by a positioning request that is sent.

Embodiment 7

The first apparatus according to any of the preceding embodiments, wherein the at least one fingerprint information is determined based at least partially on one or more measurements gathered by at least one sensor.

Embodiment 8

The first apparatus according to any of the preceding embodiments, wherein the first apparatus is or is part of mobile terminal.

Embodiment 9

The first apparatus according to any of the preceding embodiments, wherein the memory is comprised by the first apparatus.

Embodiment 10

The first apparatus according to any of the preceding embodiments, the at least one memory and the computer program code configured to, with the at least one processor, cause the apparatus further to perform:
- determining a status information indicative of whether or not the first set of tuning parameters is outdated in case such a first set of tuning parameters is stored, wherein the status information is determined based at least partially on one or more reset parameters indicative of a change of a device specific parameter,
- wherein the status information is determined prior to the sending of the positioning request, and wherein dependent upon the status information the first set of tuning parameters is comprised by or is accompanying the positioning request.

Embodiment 11

The first apparatus according to embodiment 10, wherein the one or more reset parameters are represented by one or more of the following device specific changes:
  i) one or more firmware changes;
  ii) one or more physical changes;
  iii) one or more further changes influencing the one or more measurements gathered by the at least one sensor.

Embodiment 12

A second apparatus comprising at least one processor and at least one memory including computer program code, the at least one memory and the computer program code configured to, with the at least one processor, cause the apparatus to at least perform:
- receiving at least one fingerprint information indicative of at least one identifier of a cellular and/or a non-cellular radio network, wherein based on the identifier at least one cell of the cellular radio network and/or at least one node of the non-cellular radio network is identifiable, wherein the at least one fingerprint information optionally comprises or is accompanied by a first set of tuning parameters;
- determining a second set of tuning parameters, wherein the first and/or the second set of tuning parameters respectively comprise a correction value for compensating a bias for the at least one fingerprint information, wherein based at least partially on the correction value device specific parameters influencing the at least one fingerprint information can be compensated; and
- outputting the determined second set of tuning parameters.

Embodiment 13

The second apparatus according to embodiment 12, wherein the second set of tuning parameters is determined based at least partially on the at least one fingerprint information and optionally on the first set of tuning parameters, wherein the second set of tuning parameters converges to the actual bias in case the second set of tuning parameters is determined based at least partially on the at least one fingerprint information and the first set of tuning parameters.

Embodiment 14

The second apparatus according to embodiment 12 or embodiment 13, wherein the at least one fingerprint information is relayed by a third apparatus to the second apparatus, wherein the third apparatus comprises or is connectable to a memory comprising one or more sets of tuning parameters, wherein the at least one fingerprint information is relayed together with a corresponding set of tuning parameters to the second apparatus.

Embodiment 15

The second apparatus according to any of the embodiments 12 to 14, the at least one memory and the computer program code configured to, with the at least one processor, cause the apparatus further to perform:
- determining or trigger determining a location estimate based at least partially on the at least one fingerprint information; and wherein the second set of tuning parameters is further determined based at least partially on the location estimate and a location representation of the location of a device that determined the at least one fingerprint information prior to the receiving of the at least one fingerprint information.

Embodiment 16

The second apparatus according to any of the embodiment 12 to 15, wherein the at least one fingerprint information further comprises or represents one or more signal strength values, wherein each of the one or more signal strength values is indicative of a signal strength of one or more signals observable at the location at which one or more measurements used for determining the at least one fingerprint information are gathered, and wherein the one or more signals are sent by at least one cell of the cellular radio network and/or by at least one radio node of the non-cellular radio network.

Embodiment 17

The second apparatus according to any of the embodiments 12 to 16, wherein the determined second set of tuning parameters is outputted only in case the determined second set of tuning parameters differs from the first set of tuning parameters in case such a first set of tuning parameters is received.

Embodiment 18

The second apparatus according to any of the embodiments 12 to 17, wherein the second apparatus is or is part of server or a server cloud.

Embodiment 19

A first method, comprising:
determining at least one fingerprint information indicative of at least one identifier of a cellular and/or a non-cellular radio network, wherein based on the identifier at least one cell of the cellular radio network and/or at least one node of the non-cellular radio network is identifiable;
sending the at least one fingerprint information, wherein the at least one fingerprint information comprises or is accompanied by a first set of tuning parameters in case such a set of tuning parameters is stored in a memory;
receiving a second set of tuning parameters in response to the sending of the at least one fingerprint information, wherein the first and/or the second set of tuning parameters respectively comprise a correction value for compensating a bias for the at least one fingerprint information; and
storing the received second set of tuning parameters, wherein the first set of tuning parameters is updated with the second set of tuning parameters enabling to iteratively converge the set of tuning parameters to the actual bias.

Embodiment 20

The first method according to embodiment 19, wherein the second set of tuning parameters is stored only in case the first set of tuning parameters is outdated.

Embodiment 21

The first method according to embodiment 19 or embodiment 20, wherein the second set of tuning parameters is received only in case the first set of tuning parameters is outdated.

Embodiment 22

The first method according to any of the embodiments 19 to 21, wherein the at least one fingerprint information does not comprise or is not accompanied by the first set of tuning parameters in case the first set of tuning parameters has changed.

Embodiment 23

The first method according to any of the embodiments 19 to 22, wherein the at least one fingerprint information further comprises or represents one or more signal strength values, wherein each of the one or more signal strength values is indicative of a signal strength of one or more signals observable at the location at which one or more measurements used for determining the at least one fingerprint information are gathered, and wherein the one or more signals are sent by at least one cell of the cellular radio network and/or at least one radio node of the non-cellular radio network.

Embodiment 24

The first method according to any of the embodiments 19 to 23, wherein the at least one fingerprint information is comprised by a positioning request that is sent.

Embodiment 25

The first method according to any of the embodiments 19 to 24, wherein the at least one fingerprint information is determined based at least partially on one or more measurements gathered by at least one sensor.

Embodiment 26

The first method according to any of the embodiments 19 to 25 further comprising:
determining a status information indicative of whether or not the first set of tuning parameters is outdated in case such a first set of tuning parameters is stored, wherein the status information is determined based at least partially on one or more reset parameters indicative of a change of a device specific parameter,
wherein the status information is determined prior to the sending of the positioning request, and wherein dependent upon the status information the first set of tuning parameters is comprised by or is accompanying the positioning request.

Embodiment 27

The first method according to embodiment 26, wherein the one or more reset parameters are represented by one or more of the following device specific changes:
i) one or more firmware changes;
ii) one or more physical changes;
iii) one or more further changes influencing the one or more measurements gathered by the at least one sensor.

Embodiment 28

A second method, comprising:
receiving at least one fingerprint information indicative of at least one identifier of a cellular and/or a non-cellular radio network, wherein based on the identifier at least one cell of the cellular radio network and/or at least one node of the non-cellular radio network is identifiable, wherein the at least one fingerprint information optionally comprises or is accompanied by a first set of tuning parameters;
determining a second set of tuning parameters, wherein the first and/or the second set of tuning parameters respectively comprise a correction value for at least partially on the correction value device specific parameters influencing the at least one fingerprint information can be compensated; and
outputting the determined second set of tuning parameters.

Embodiment 29

The second method according to embodiment 28, wherein the second set of tuning parameters is determined based at least partially on the at least one fingerprint information and optionally on the first set of tuning parameters, wherein the second set of tuning parameters converges to the actual bias in case the second set of tuning parameters is determined based at least partially on the at least one fingerprint information and the first set of tuning parameters.

Embodiment 30

The second method according to embodiment 28 or embodiment 29, wherein the at least one fingerprint information is relayed by a third apparatus to the second apparatus, wherein the third apparatus comprises or is connectable to a memory comprising one or more sets of tuning parameters, wherein the at least one fingerprint information is relayed together with a corresponding set of tuning parameters to the second apparatus.

Embodiment 31

The second method according to any of the embodiments 28 to 30, further comprising:
  determining or trigger determining a location estimate based at least partially on the at least one fingerprint information; and wherein the second set of tuning parameters is further determined based at least partially on the location estimate and a location representation of the location of a device that determined the at least one fingerprint information prior to the receiving of the at least one fingerprint information.

Embodiment 32

The second method according to any of the embodiments 28 to 31, wherein the at least one fingerprint information further comprises or represents one or more signal strength values, wherein each of the one or more signal strength values is indicative of a signal strength of one or more signals observable at the location at which one or more measurements used for determining the at least one fingerprint information are gathered, and wherein the one or more signals are sent by at least one cell of the cellular radio network and/or by at least one radio node of the non-cellular radio network.

Embodiment 33

The second method according to any of the embodiments 28 to 32, wherein the determined second set of tuning parameters is outputted only in case the determined second set of tuning parameters differs from the first set of tuning parameters in case such a first set of tuning parameters is received.

Embodiment 34

A first apparatus configured to perform and/or control or comprising respective means for performing and/or controlling the method of any of the embodiments 19 to 27.

Embodiment 35

The first apparatus according to embodiment 34, wherein the first apparatus is or is part of mobile terminal.

Embodiment 36

The first apparatus according to embodiment 34 or embodiment 35, wherein a memory is comprised by the first apparatus.

Embodiment 37

A second apparatus configured to perform and/or control or comprising respective means for performing and/or controlling the method of any of the embodiments 28 to 33.

Embodiment 38

The second method according to embodiment 37, wherein the second apparatus is or is part of server or a server cloud.

Embodiment 39

A first computer program, the computer program when executed by a processor causing an apparatus to perform and/or control the actions of the method according to any of the embodiments 19 to 27.

Embodiment 40

A second computer program, the computer program when executed by a processor causing an apparatus to perform and/or control the actions of the method according to any of the embodiments 28 to 33.

Embodiment 41

A first tangible computer-readable medium storing computer program code, the computer program code when executed by a processor causing an apparatus to perform and/or control the actions of the first method according to any of the embodiments 19 to 27.

Embodiment 42

A second tangible computer-readable medium storing computer program code, the computer program code when executed by a processor causing an apparatus to perform and/or control the actions of the second method according to any of the embodiments 28 to 33.

Embodiment 43

A system, comprising:
  at least one first apparatus according to any of the embodiments 1 to 11, which is configured to perform and/or control the method according to any of the embodiments 19 to 27, and at least one second apparatus according to any of the embodiments 12 to 18, which is configured to perform and/or control the method according to any of the embodiments 28 to 33.

Embodiment 44

A system, comprising:
  at least one first apparatus according to any of the embodiments 34 to 36; and
  at least one second apparatus according to any of the embodiments 37 or 38.

Embodiment 45

The system according to embodiment 44, further comprising at least one third apparatus that is configured to perform and/or control the method steps of embodiment 30.

In the present specification, any presented connection in the described embodiments is to be understood in a way that the involved components are operationally coupled. Thus, the connections can be direct or indirect with any number or combination of intervening elements, and there may be merely a functional relationship between the components.

Moreover, any of the methods, processes and actions described or illustrated herein may be implemented using executable instructions in a general-purpose or special-purpose processor and stored on a computer-readable storage medium (e.g., disk, memory, or the like) to be executed by such a processor. References to a 'computer-readable storage medium' should be understood to encompass specialized circuits such as FPGAs, ASICs, signal processing devices, and other devices.

The expression "A and/or B" is considered to comprise any one of the following three scenarios: (i) A, (ii) B, (iii) A and B. Furthermore, the article "a" is not to be understood as "one", i.e. use of the expression "an element" does not preclude that also further elements are present. The term "comprising" is to be understood in an open sense, i.e. in a way that an object that "comprises an element A" may also comprise further elements in addition to element A.

It will be understood that all presented embodiments are only exemplary, and that any feature presented for a particular example embodiment may be used with any aspect of the invention on its own or in combination with any feature presented for the same or another particular example embodiment and/or in combination with any other feature not mentioned. In particular, the example embodiments presented in this specification shall also be understood to be disclosed in all possible combinations with each other, as far as it is technically reasonable and the example embodiments are not alternatives with respect to each other. It will further be understood that any feature presented for an example embodiment in a particular category (method/apparatus/computer program/system) may also be used in a corresponding manner in an example embodiment of any other category. It should also be understood that presence of a feature in the presented example embodiments shall not necessarily mean that this feature forms an essential feature of the invention and cannot be omitted or substituted.

The statement of a feature comprises at least one of the subsequently enumerated features is not mandatory in the way that the feature comprises all subsequently enumerated features, or at least one feature of the plurality of the subsequently enumerated features. Also, a selection of the enumerated features in any combination or a selection of only one of the enumerated features is possible. The specific combination of all subsequently enumerated features may as well be considered. Also, a plurality of only one of the enumerated features may be possible.

The sequence of all method steps presented above is not mandatory, also alternative sequences may be possible. Nevertheless, the specific sequence of method steps exemplarily shown in the figures shall be considered as one possible sequence of method steps for the respective embodiment described by the respective figure.

The invention has been described above by means of example embodiments. It should be noted that there are alternative ways and variations which are obvious to a skilled person in the art and can be implemented without deviating from the scope of the appended claims.

The invention claimed is:

1. A first apparatus comprising at least one processor and at least one memory including computer program code, the at least one memory and the computer program code configured to, with the at least one processor, cause the apparatus to at least perform:
   determining at least one fingerprint information indicative of at least one identifier of a cellular and/or a non-cellular radio network, wherein based on the identifier at least one cell of the cellular radio network and/or at least one node of the non-cellular radio network is identifiable;
   sending the at least one fingerprint information, wherein the at least one fingerprint information comprises or is accompanied by a first set of tuning parameters in case such a set of tuning parameters is stored in a memory;
   receiving a second set of tuning parameters in response to the sending of the at least one fingerprint information, wherein the first and/or the second set of tuning parameters respectively comprise a correction value for compensating a bias for the at least one fingerprint information; and
   storing the received second set of tuning parameters, wherein the first set of tuning parameters is updated with the second set of tuning parameters enabling to iteratively converge the set of tuning parameters to the actual bias.

2. The first apparatus according to claim 1, wherein the second set of tuning parameters is stored only in case the first set of tuning parameters is outdated.

3. The first apparatus according to claim 1, wherein the second set of tuning parameters is received only in case the first set of tuning parameters is outdated.

4. The first apparatus according to claim 1, wherein the at least one fingerprint information does not comprise or is not accompanied by the first set of tuning parameters in case the first set of tuning parameters has changed.

5. The first apparatus according to claim 1, wherein the at least one fingerprint information further comprises or represents one or more signal strength values, wherein each of the one or more signal strength values is indicative of a signal strength of one or more signals observable at the location at which one or more measurements used for determining the at least one fingerprint information are gathered, and wherein the one or more signals are sent by at least one cell of the cellular radio network and/or by at least one radio node of the non-cellular radio network.

6. The first apparatus according to claim 1, wherein the at least one fingerprint information is comprised by a positioning request that is sent.

7. A second apparatus comprising at least one processor and at least one memory including computer program code, the at least one memory and the computer program code configured to, with the at least one processor, cause the second apparatus to at least perform:
   receiving at least one fingerprint information indicative of at least one identifier of a cellular and/or a non-cellular radio network, wherein based on the identifier at least one cell of the cellular radio network and/or at least one node of the non-cellular radio network is identifiable, wherein the at least one fingerprint information comprises or is accompanied by a first set of tuning parameters;
   determining a second set of tuning parameters, wherein the first and the second set of tuning parameters respectively comprise a correction value for compensating a bias for the at least one fingerprint information, wherein based at least partially on the correction value the at least one fingerprint information can be compensated for device specific parameters that influence the at least one fingerprint information; and outputting the determined second set of tuning parameters.

8. The second apparatus according to claim 7, wherein the second set of tuning parameters is determined based at least partially on the at least one fingerprint information and on the first set of tuning parameters, wherein the second set of tuning parameters converges to the actual bias in case the second set of tuning parameters is determined based at least partially on the at least one fingerprint information and the first set of tuning parameters.

9. The second apparatus according to claim 7, wherein the at least one fingerprint information is relayed by a third apparatus to the second apparatus, wherein the third apparatus comprises or is connectable to a memory comprising one or more sets of tuning parameters, wherein the at least one fingerprint information is relayed together with a corresponding set of tuning parameters to the second apparatus.

10. The second apparatus according to claim 7, the at least one memory and the computer program code configured to, with the at least one processor, cause the apparatus further to perform:
determining or trigger determining a location estimate based at least partially on the at least one fingerprint information; and
wherein the second set of tuning parameters is further determined based at least partially on the location estimate and a location representation of the location of a device that determined the at least one fingerprint information prior to the receiving of the at least one fingerprint information.

11. The second apparatus according to claim 7, wherein the at least one fingerprint information further comprises or represents one or more signal strength values, wherein each of the one or more signal strength values is indicative of a signal strength of one or more signals observable at the location at which one or more measurements used for determining the at least one fingerprint information are gathered, and wherein the one or more signals are sent by at least one cell of the cellular radio network and/or by at least one radio node of the non-cellular radio network.

12. A first method, comprising:
determining at least one fingerprint information indicative of at least one identifier of a cellular and/or a non-cellular radio network, wherein based on the identifier at least one cell of the cellular radio network and/or at least one node of the non-cellular radio network is identifiable;
sending the at least one fingerprint information, wherein the at least one fingerprint information comprises or is accompanied by a first set of tuning parameters in case such a set of tuning parameters is stored in a memory;
receiving a second set of tuning parameters in response to the sending of the at least one fingerprint information, wherein the first and/or the second set of tuning parameters respectively comprise a correction value for compensating a bias for the at least one fingerprint information; and
storing the received second set of tuning parameters, wherein the first set of tuning parameters is updated with the second set of tuning parameters enabling to iteratively converge the set of tuning parameters to the actual bias.

13. The first method according to claim 12, wherein the second set of tuning parameters is stored only in case the first set of tuning parameters is outdated.

14. The first method according to claim 12, wherein the second set of tuning parameters is received only in case the first set of tuning parameters is outdated.

15. The first method according to claim 12, wherein the at least one fingerprint information does not comprise or is not accompanied by the first set of tuning parameters in case the first set of tuning parameters has changed.

16. The first method according to claim 12, wherein the at least one fingerprint information further comprises or represents one or more signal strength values, wherein each of the one or more signal strength values is indicative of a signal strength of one or more signals observable at the location at which one or more measurements used for determining the at least one fingerprint information are gathered, and wherein the one or more signals are sent by at least one cell of the cellular radio network and/or by at least one radio node of the non-cellular radio network.

17. The first method according to claim 12, wherein the at least one fingerprint information is comprised by a positioning request that is sent.

18. The first apparatus according to claim 1, wherein the at least one memory and the computer program code are further configured to, with the at least one processor, cause the apparatus to determine a status information indicative of whether or not the first set of tuning parameters is outdated in case such a first set of tuning parameters is stored, wherein the status information is determined based at least partially on one or more reset parameters indicative of a change of a device specific parameter, wherein the status information is determined prior to the sending of a positioning request, and wherein dependent upon the status information the first set of tuning parameters is comprised by or is accompanying the positioning request.

19. The first apparatus according to claim 18, wherein the one or more reset parameters are represented by one or more of the following device specific changes:
i) one or more firmware changes;
ii) one or more physical changes; or
iii) one or more further changes influencing one or more measurements gathered by at least one sensor.

20. The first method according to claim 12, further comprising determining a status information indicative of whether or not the first set of tuning parameters is outdated in case such a first set of tuning parameters is stored, wherein the status information is determined based at least partially on one or more reset parameters indicative of a change of a device specific parameter, wherein the status information is determined prior to the sending of a positioning request, and wherein dependent upon the status information the first set of tuning parameters is comprised by or is accompanying the positioning request.

* * * * *